US008915323B2

(12) United States Patent
Tsujii et al.

(10) Patent No.: US 8,915,323 B2
(45) Date of Patent: Dec. 23, 2014

(54) TWO-REAR-WHEEL ELECTRIC VEHICLE

(71) Applicant: Yamaha Hatsudoki Kabushiki Kaisha, Iwata-shi, Shizuoka (JP)

(72) Inventors: Eiichirou Tsujii, Shizuoka (JP); Junji Terada, Shizuoka (JP); Atsushi Ueno, Shizuoka (JP); Masatoshi Yamada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/349,128

(22) PCT Filed: Oct. 1, 2012

(86) PCT No.: PCT/JP2012/075326
§ 371 (c)(1),
(2), (4) Date: Apr. 2, 2014

(87) PCT Pub. No.: WO2013/051493
PCT Pub. Date: Apr. 11, 2013

(65) Prior Publication Data
US 2014/0238764 A1 Aug. 28, 2014

(30) Foreign Application Priority Data

Oct. 6, 2011 (JP) .................................. 2011-222265
Sep. 11, 2012 (JP) .................................. 2012-199612

(51) Int. Cl.
*B62K 5/06* (2006.01)
(Continued)

(52) U.S. Cl.
CPC .. *B62K 5/06* (2013.01); *B62M 7/12* (2013.01); *B60G 21/05* (2013.01);
(Continued)

(58) Field of Classification Search
CPC ............ B62K 5/06; B62K 5/10; B62K 25/20; B62K 2208/00; B62K 11/02; B62K 11/04; B62K 2204/00

USPC ............ 180/220, 312, 207.3, 210–216, 206.1
See application file for complete search history.

(56) References Cited

U.S. PATENT DOCUMENTS 4,429,760 A * 2/1984 Koizumi et al. ............... 180/215
4,666,018 A * 5/1987 Shibuya ........................ 180/213
(Continued)

FOREIGN PATENT DOCUMENTS

JP 5-213253 A 8/1993
JP 2001-171589 A 6/2001
(Continued)

OTHER PUBLICATIONS

Official Communication issued in International Patent Application No. PCT/JP2012/075326, mailed on Dec. 25, 2012.
(Continued)

*Primary Examiner* — Drew Brown
(74) *Attorney, Agent, or Firm* — Keating & Bennett, LLP

(57) ABSTRACT

A two-rear-wheel electric vehicle configured to lean its vehicle body frame when turning includes a vehicle body frame, a pair of right and left rear arms, a battery, and a shock absorber. The vehicle body frame includes a head pipe, a front inclined portion, a bottom portion, and a rear inclined portion. The front inclined portion extends obliquely downward and rearward from the head pipe. The bottom portion includes a front support portion that supports a front end portion of the shock absorber. The bottom portion extends rearward in a front-back direction of the vehicle from a rear end portion of the front inclined portion. The rear inclined portion includes a battery support portion, and extends obliquely upward and rearward from a rear end portion of the bottom portion. A swing shaft is positioned rearward of the front support portion and below the battery support portion.

20 Claims, 11 Drawing Sheets

(51) Int. Cl.
    *B62K 5/10*     (2013.01)
    *B62M 7/12*     (2006.01)
    *B60G 21/05*    (2006.01)
    *B62K 5/027*    (2013.01)
    *B60G 3/14*     (2006.01)

(52) U.S. Cl.
    CPC . *B62K 5/027* (2013.01); *B62K 5/10* (2013.01); *B60G 3/145* (2013.01); *B62K 2204/00* (2013.01); *B62K 2208/00* (2013.01); *B60G 2300/122* (2013.01); *B60G 2300/45* (2013.01)
    USPC .......................................... 180/216; 180/312

(56) References Cited

U.S. PATENT DOCUMENTS

| | | | |
|---|---|---|---|
| 7,204,333 B2* | 4/2007 | Kuroki et al. | 180/210 |
| 8,177,013 B2* | 5/2012 | Chang et al. | 180/215 |
| 2006/0060400 A1 | 3/2006 | Iwashita et al. | |
| 2013/0075178 A1* | 3/2013 | Petersson | 180/220 |
| 2013/0105240 A1* | 5/2013 | Tsai et al. | 180/219 |
| 2013/0277132 A1* | 10/2013 | Kawatani | 180/220 |
| 2013/0292198 A1* | 11/2013 | Matsuda | 180/220 |

FOREIGN PATENT DOCUMENTS

| | | |
|---|---|---|
| JP | 2006-56402 A | 3/2006 |
| JP | 3161882 U | 8/2010 |
| KR | 10-0968171 B1 | 7/2010 |

OTHER PUBLICATIONS

Official Communication issued in corresponding European Patent Application No. 12838651.3, mailed on Aug. 13, 2014.

* cited by examiner

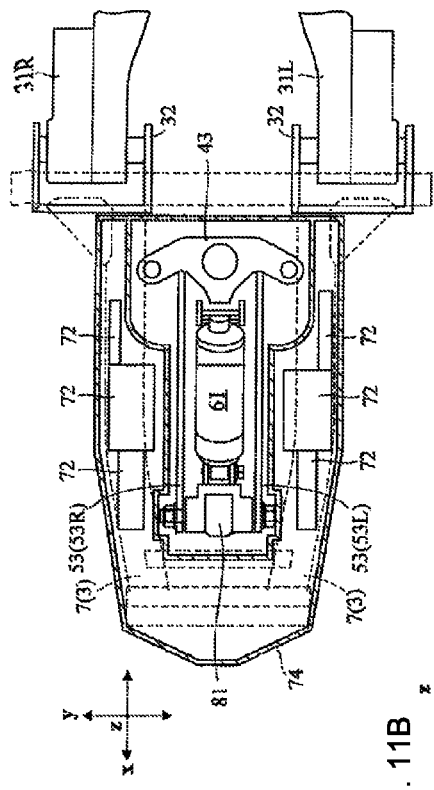
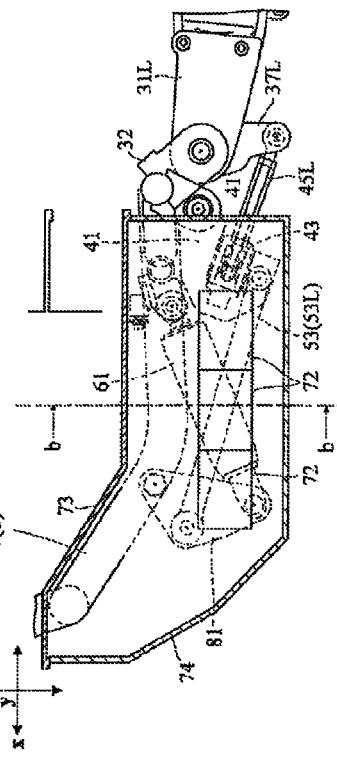
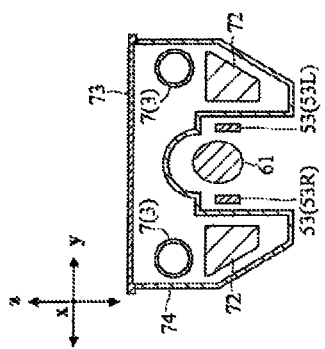
FIG. 11A
FIG. 11B
FIG. 11C

TWO-REAR-WHEEL ELECTRIC VEHICLE

BACKGROUND OF THE INVENTION

1. Field of the Invention

The present invention relates to a two-rear-wheel electric vehicle configured to lean its vehicle body when turning.

2. Description of the Related Art

Examples of a conventional two-rear-wheel electric vehicle include a two-rear-wheel electric vehicle disclosed in Japanese Patent Application Laid-Open No. 5-213253.

In the two-rear-wheel electric vehicle disclosed in Japanese Patent Application Laid-Open No. 5-213253, a pair of right and left electric power units are located below a central portion of a vehicle body frame. The right and left electric power units are configured to drive the respective rear wheels. Each of the electric power units includes a drive motor, a primary speed reduction mechanism that reduces the speed of a rotational drive force supplied from the drive motor, a power transmission mechanism that transmits the rotational drive force whose speed has been reduced to the rear wheel side, and a secondary speed reduction mechanism that reduces the speed of the rotational drive force transmitted from the power transmission mechanism. Each of the electric power units constitutes a swing arm. The secondary speed reduction mechanism transmits the rotational drive force to the rear wheel that is supported on a rear end portion of the corresponding electric power unit. The electric vehicle also includes a pair of right and left shock absorber units each located between an upper rear portion of the vehicle body frame and the rear end portion of the corresponding electric power unit.

The two-rear-wheel electric vehicle disclosed in Japanese Patent Application Laid-Open No. 5-213253 also includes a frame holder assembly that is fixed by a lower central portion and the upper rear portion of the vehicle body frame. A battery is located in the frame holder assembly.

Such a two-rear-wheel electric vehicle is able to stand on its own because a pair of right and left rear wheels are provided. Therefore, a driving operation is relatively easy when the vehicle is running at a low speed. Additionally, the two-rear-wheel electric vehicle can be caused to run by less power than a four-wheel vehicle can, and has a more excellent loading capacity than a two-wheel vehicle does. Thus, the two-rear-wheel electric vehicle achieves stable running under a state where a large amount of baggage is loaded thereon. The two-rear-wheel electric vehicle includes a battery serving as a power source. Since a possible travel distance obtained per charging is limited by the capacity of the battery, the two-rear-wheel electric vehicle is better suited for a short-distance travel than a long-distance travel.

Moreover, the two-rear-wheel electric vehicle disclosed in Japanese Patent Application Laid-Open No. 5-213253, which is not able to lean its vehicle body when turning, needs to maintain the attitude of the vehicle body against a centrifugal force while the vehicle is running on a curve.

In this respect, a two-rear-wheel electric vehicle configured to lean its vehicle body when turning is allowed to turn with the vehicle body leaning to the inner side of a curve. This provides a high stability while the vehicle is running on a curve, and does not require high driving skill.

In view of the above, a two-rear-wheel electric vehicle configured to lean its vehicle body when turning is a vehicle suitable for, for example, purposes of short-distance delivery services or purposes (such as shopping) intimately involved in daily lives of females and the elderly.

In consideration of use for the purposes of short-distance delivery services or purposes intimately involved in daily lives of females and the elderly, a high degree of convenience is demanded of the two-rear-wheel electric vehicle configured to lean its vehicle body when turning. To be specific, the convenience includes requiring a reduced frequency of charging, having a low weight to provide easy handling, and the like.

As for the frequency of charging, in general, a vehicle including an engine does not require much time for refueling with gasoline, but an electric vehicle requires relatively much time for charging a battery. For example, in a case where a user, when carrying out a delivery service, notices that a remaining battery charge of the electric vehicle is low but there is no time for charging, the delivery service may be disabled. In a case where a user, when going out for an urgent matter, notices that a remaining battery charge of the electric vehicle is low but there is no time for charging, the user has to abandon going out with the electric vehicle. Similarly, the electric vehicle may force the user to refrain from the use thereof when the remaining battery charge is low. Thus, a reduced frequency of charging is preferable in the two-rear-wheel electric vehicle configured to lean its vehicle body when turning. In other words, a large battery capacity is preferred, and less power consumption is preferred.

Here, the two-rear-wheel electric vehicle includes two rear wheels, and therefore the weight of the vehicle body is in general larger than that of a two-wheel vehicle. An increase in the weight of the vehicle body leads to an increase in power consumption. In order to reduce the frequency of charging, the battery capacity needs to be increased. In the two-rear-wheel electric vehicle according to Japanese Patent Application Laid-Open No. 5-213253 as well, in order to increase the battery capacity, a wide space is necessary for installation of the battery.

However, using a large-size battery for the increase in the battery capacity causes not only an increase in the weight of the battery but also the need to increase the weight of the vehicle body frame because the rigidity of the vehicle body frame must be ensured, which results in a further increase in the weight of the vehicle body. A vicious cycle follows in this manner. Additionally, an increase in the weight of the vehicle body makes the handling of the vehicle body difficult, which deteriorates the convenience. Therefore, how to achieve a weight reduction of the vehicle body while ensuring a large battery capacity is a problem.

SUMMARY OF THE INVENTION

Preferred embodiments of the present invention provide a two-rear-wheel electric vehicle that achieves a weight reduction of a vehicle body while ensuring a large battery capacity.

In view of the foregoing problems, the present inventors have carried out intensive studies, and have made the following discoveries.

In the two-rear-wheel electric vehicle disclosed in Japanese Patent Application Laid-Open No. 5-213253, the electric power units (swing arms) are located below the central portion of the vehicle body frame, and the battery is supported by the lower central portion and the upper rear portion of the vehicle body frame.

Thus, in Japanese Patent Application Laid-Open No. 5-213253, the electric power units and the battery, which are heavy loads, are supported on the lower central portion of the vehicle body frame. The lower central portion of the vehicle body frame has a high strength because it is originally intended to receive a load of the vehicle body between a front wheel and the rear wheels. Thus, the lower central portion of the vehicle body is suitable for the support of a heavy load. On the other hand, the shock absorber unit, which is lighter than the electric power unit and the battery, is connected to the upper rear portion of the vehicle body frame.

However, in a case where the shock absorber unit is connected to the upper rear portion of the vehicle body frame, an increased angle is formed between the direction (front-upward direction) in which an impact transmitted from the rear wheel to the upper rear portion of the vehicle body frame via the shock absorber unit and the direction (in a rear-upward direction) in which the upper rear portion of the vehicle body frame extends. Consequently, a strong force pushing the upper rear portion of the vehicle body frame in the upward direction is applied when an impact occurs. As a result, a large bending load (a bending load tending to bend the lower central portion of vehicle body frame into a downward convex shape) is applied to the vehicle body frame. Although an input of an impact to the vehicle body frame is only temporary, a dynamic weight caused by the impact is likely to be larger than a static weight of the heavy load. Therefore, to ensure a strength of the vehicle body frame against the bending load, the weight of the vehicle body frame is inevitably increased.

The present inventors, focusing on a dynamic load on the vehicle body frame, have discovered the following features.

A front support portion that supports a front end portion of a shock absorber is provided at a bottom portion of the vehicle body frame. This reduces the angle formed between the direction in which an impact is transmitted from the rear wheel to the vehicle body frame via the shock absorber and the direction in which the bottom portion of the vehicle body frame extends. As a result, a bending load that is applied to the vehicle body frame when an impact occurs is reduced.

Moreover, under the state where the front support portion that supports the front end portion of the shock absorber is provided at the bottom portion of the vehicle body frame, a battery support portion is provided at a rear inclined portion of the vehicle body frame, and additionally the axis on which a rear arm swings is set at a position rearward of the front support portion and below the battery support portion. As a result, a head pipe, a front inclined portion, the bottom portion, and the rear arm are successively arranged in this order from the front wheel side toward the rear wheel, thus providing a support structure between the front wheel and the rear wheels. At a rear end portion of the bottom portion, the rear inclined portion branches out of the support structure between the front wheel and the rear wheels, to extend obliquely upward and rearward. Under this condition, when a static weight (downward load) of the battery is applied to the battery support portion that is positioned in the rear inclined portion, a downward load is applied to the bottom portion and a relatively strong reaction force traveling upward also occurs in the bottom portion. The reaction force traveling upward lessens the bending load tending to bend the bottom portion of the vehicle body frame into a downward convex shape at a time of occurrence of an impact.

Reducing a load applied to the vehicle body frame (particularly, to the bottom portion of the vehicle body frame) in this manner significantly reduces or prevents an increase in the weight of the vehicle body frame which would be otherwise necessary to ensure a strength of the vehicle body frame. Furthermore, the static weight of the battery, which is applied to the battery support portion, lessens the bending load tending to bend the bottom portion into a downward convex shape. Accordingly, an increase in the size of the battery, which provides an increase in the battery capacity, is easily obtained.

Preferred embodiments of the present invention are accomplished based on the above-described discoveries, and includes the following configurations.

A two-rear-wheel electric vehicle configured to lean a vehicle body frame thereof when turning, the two-rear-wheel electric vehicle including a vehicle body frame; a pair of right and left rear arms that are supported on the vehicle body frame, the pair of right and left rear arms being swingable on a swing shaft, the pair of right and left rear arms separately supporting a pair of right and left rear wheels, respectively; a battery that drives the pair of right and left rear wheels; and a shock absorber that lessens an impact that the pair of right and left rear wheels receive from a road surface, the shock absorber being configured such that the impact is transmitted thereto via the pair of right and left rear arms, the vehicle body frame including a head pipe, a front inclined portion extending obliquely downward and rearward from the head pipe, a bottom portion extending rearward in a front-back direction of the vehicle from a rear end portion of the front inclined portion, the bottom portion including a front support portion that directly or indirectly supports a front end portion of the shock absorber, and a rear inclined portion extending obliquely upward and rearward from a rear end portion of the bottom portion, the rear inclined portion including a battery support portion that supports the battery, the swing shaft being positioned rearward of the front support portion and below the battery support portion.

Preferred embodiments of the present invention lessen a load that is applied to the vehicle body frame (particularly to the bottom portion of the vehicle body frame) as described above, thus significantly reducing or preventing an increase in the weight of the vehicle body frame, which would be otherwise necessary to ensure a strength of the vehicle body frame. Additionally, an increase in the size of the battery, which provides an increase in the battery capacity, is easily obtained. Accordingly, a weight reduction of a vehicle body is achieved while ensuring a large battery capacity.

Preferred embodiments of the present invention also provide a two-rear-wheel electric vehicle that achieves a weight reduction of a vehicle body while ensuring a large battery capacity.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B are diagrams each showing a cross-section as taken along the line a-a of FIG. 2, in which FIG. 4A illustrates a state where a rocker member is in a neutral position, and FIG. 4B illustrates a state where the rocker member is not in the neutral position.

FIGS. 8A and 8B are side views each showing a portion of the electric vehicle in which FIG. 8A illustrates a state where the vehicle is stopped upright, and FIG. 8B illustrates a state where an impact is received from a road surface.

FIGS. 11A, 11B, and 11C are diagrams in which FIG. 11A is a horizontal cross-sectional view of a portion of the electric vehicle according to the first variation, FIG. 11B is a vertical cross-sectional view of the portion of the electric vehicle according to the first variation, and FIG. 11C is a cross-sectional view as taken along the line b-b of FIG. 11B.

DETAILED DESCRIPTION OF THE PREFERRED EMBODIMENTS

Hereinafter, a two-rear-wheel electric vehicle according to various preferred embodiments of the present invention will be described with reference to the drawings.

Figure 1:
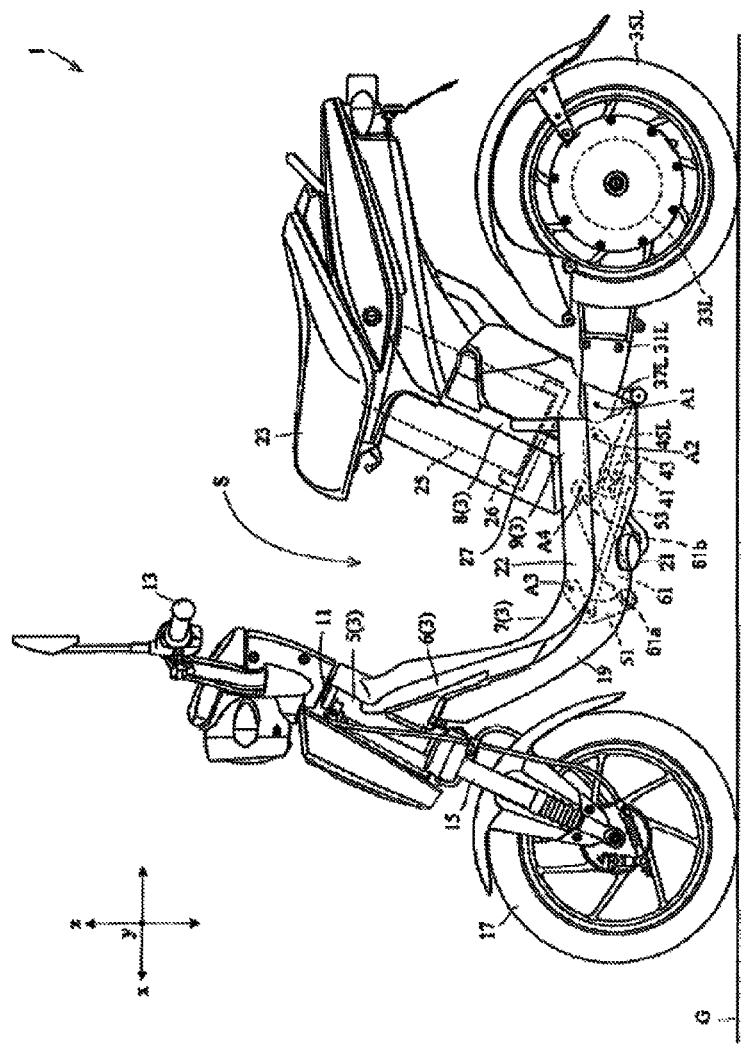
FIG. 1 is a left side view of an electric vehicle according to a first preferred embodiment of the present invention.
Figure 2:
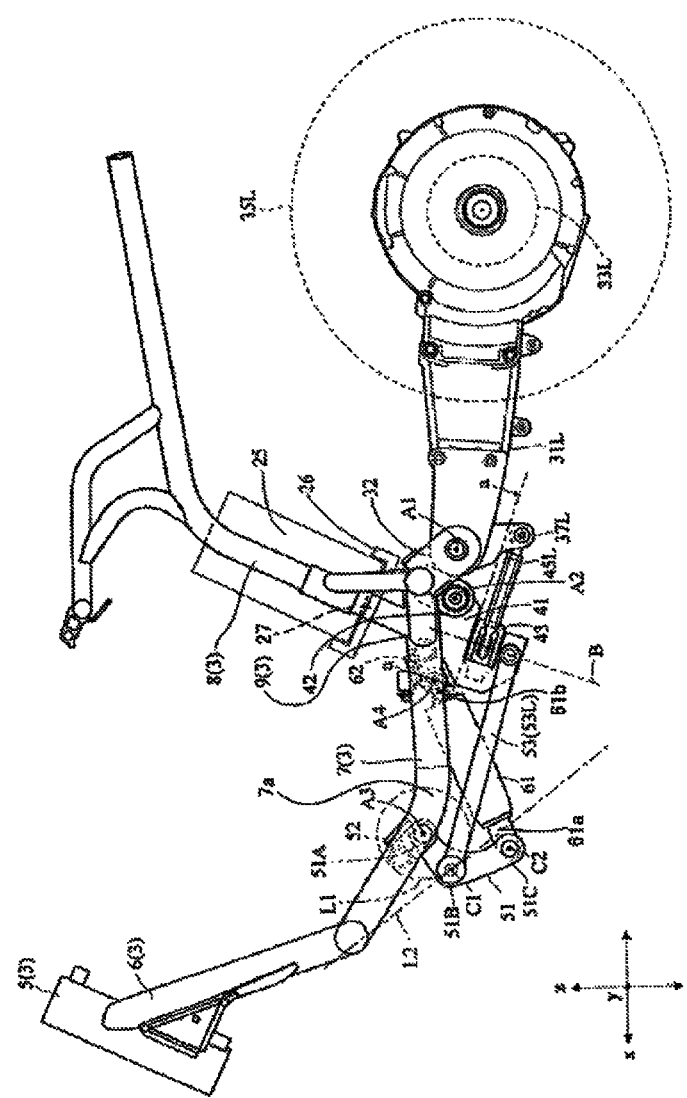
FIG. 2 is a left side view showing a portion of the electric vehicle according to the first preferred embodiment of the present invention.
Figure 3:
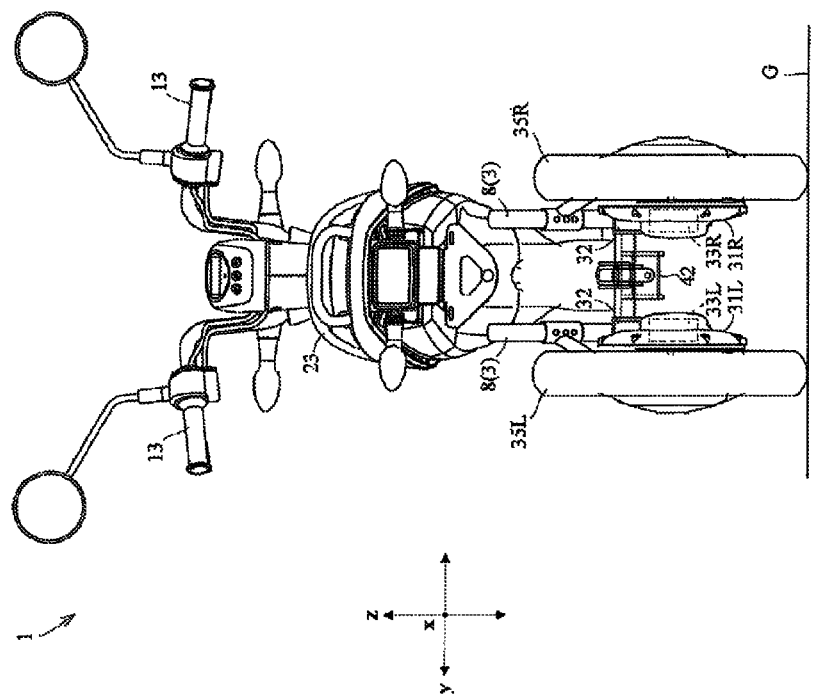
FIG. 3 is a rear view of the electric vehicle according to the first preferred embodiment of the present invention.

FIG. 1 is a left side view of an electric vehicle according to a preferred embodiment of the present invention. FIG. 2 is a left side view showing a portion of the electric vehicle. FIG. 3 is a rear view of the electric vehicle.

In the drawings, x direction is the front-back direction of a vehicle body, y direction is the vehicle widthwise direction of the vehicle body, and z direction is the vertical direction of the vehicle body. The front-back direction x, the vehicle width direction y, and the vertical direction z of the vehicle body are perpendicular to one another. In a state where the vehicle body is upright on a horizontal road surface G, the front-back direction x and the vehicle width direction y of the vehicle body are horizontal while the vertical direction z of the vehicle body is vertical. In FIG. 1, the left side in the drawing corresponds to the front side of an electric vehicle 1, and the right side in the drawing corresponds to the rear side of the electric vehicle 1. The terms "right" and "left" are, unless otherwise stated, used to express the "right" and "left" when viewed from the perspective of a rider riding on the electric vehicle 1.

Referring to FIGS. 1 and 2, the electric vehicle 1 is preferably a three-wheel vehicle of the scooter type (an electric vehicle with one front wheel and two rear wheels), which is an example of a two-rear-wheel electric vehicle. The electric vehicle 1 includes a vehicle body frame 3. The vehicle body frame 3 includes a head pipe 5, a front inclined portion 6, a bottom portion 7, and a rear inclined portion 8. The vehicle body frame 3 is preferably an under-bone type which is specific to the scooter type of vehicle.

The head pipe 5 is provided in a front end portion of the vehicle body frame 3. A front inclined portion 6 is arranged so as to extend obliquely downward and rearward from the head pipe 5. The bottom portion 7 is arranged so as to extend substantially horizontally from a rear end portion of the front inclined portion 6 toward the rear. The rear inclined portion 8 is arranged so as to extend obliquely upward and rearward from a rear end portion of the bottom portion 7. A bent portion 9 is provided between the bottom portion 7 and the rear inclined portion 8. The front inclined portion 6, the bottom portion 7, and the rear inclined portion 8, as a whole, define a U-shaped or substantially U-shaped configuration in a side view. In the present preferred embodiment, each of the front inclined portion 6, the bottom portion 7, and the rear inclined portion 8 include a pair of right and left members. Thus, the front inclined portion 6, the bottom portion 7, and the rear inclined portion 8 that define a U-shaped or substantially U-shaped configuration are provided at each of the right and left sides with respect to the width direction of the vehicle.

Figure 8:
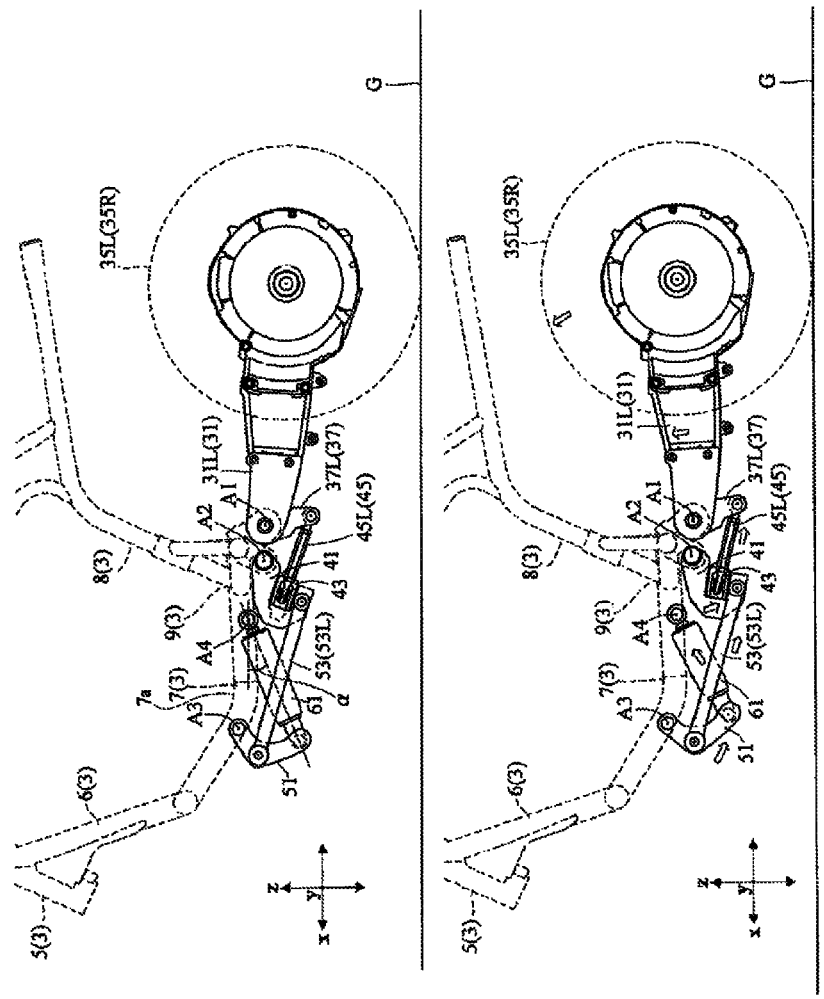

In the present preferred embodiment, the bottom portion 7 is arranged so as to extend horizontally or substantially horizontally toward the rear. However, it suffices that the bottom portion 7 could extend at least in the front-back direction of the vehicle. The angle of inclination of the bottom portion 7 (in a side view of the vehicle, the angle formed between the bottom portion 7 and a horizontal line) is smaller than the angle of inclination of the front inclined portion 6 and the angle of inclination of the rear inclined portion 8. The angle of inclination of the bottom portion 7 is smaller than the angle of inclination of the direction in which a shock absorber 61 extends and retracts under a state where the vehicle is stopped upright (FIG. 8B). The bottom portion 7, which extends in the front-back direction of the vehicle, is at a position lower than the upper ends of rear wheels 35R and 35L in a state where the vehicle is stopped upright. The entire bottom portion 7 is positioned frontward of the rear wheels 35R and 35L.

In the present preferred embodiment, as shown in FIG. 2, the bent portion 9 provided between the bottom portion 7 and the rear inclined portion 8 is angled, but the bent portion 9 may be curved.

A steering shaft 11 is rotatably received in the head pipe 5. A handlebar 13 is attached to an upper end portion of the steering shaft 11. A front fork 15 is attached to a lower end portion of the steering shaft 11. One front wheel 17 is rotatably supported on a lower end portion of the front fork 15.

A front cover 19 is mounted to the front inclined portion 6. A pair of right and left pedals 21, on which the rider puts his/her feet, are supported on the bottom portion 7. A bottom portion cover 22 is provided above the bottom portion 7. The pedals 21 and the bottom portion cover 22 correspond to a foot board of the vehicle.

A support member 52 that supports a bracket support shaft A3 is fixed to the bottom portion 7. The support member 52 is a member included in the bottom portion 7. The bracket support shaft A3 supports a front end portion 61a of the shock absorber 61 with a bracket 51 interposed therebetween. Thus, the bottom portion 7 (support member 52) includes the bracket support shaft A3 (front support portion) that indirectly supports the front end portion 61a of the shock absorber 61.

The bracket support shaft A3 is located between a pair of right and left bottom portions 7, and arranged to extend in the width direction of the vehicle. The bracket support shaft A3 is positioned frontward, relative to the center of the bottom portion 7 with respect to the front-back direction of the vehicle. As shown in FIG. 2, the bottom portion 7 includes a bent portion 7a that is bent into a downward convex shape. The bracket support shaft A3 is positioned frontward relative to the bent portion 7a.

A support member 62 that supports a shock absorber support shaft A4 is fixed to the bottom portion 7. The support member 62 is a member included in the bottom portion 7. The shock absorber support shaft A4 supports a rear end portion 61b of the shock absorber 61. Thus, the bottom portion 7 (support member 62) includes the shock absorber support shaft A4 (rear support portion) that directly supports the rear end portion 61b of the shock absorber 61.

The shock absorber support shaft A4 is located between the pair of right and left bottom portions 7, and arranged to extend in the width direction of the vehicle. The shock absorber support shaft A4 is positioned rearward relative to the center of the bottom portion 7 with respect to the front-back direction of the vehicle. The shock absorber support shaft A4 is positioned rearward relative to the bent portion 7a.

The front end portion 61a of the shock absorber 61 is supported on the bracket support shaft A3, and the rear end portion 61b of the shock absorber 61 is supported on the shock absorber support shaft A4. As a result, the shock absorber 61 is positioned between the pair of right and left bottom portions 7, and extend in the front-back direction of the vehicle.

The bottom portion 7 includes no portion or structure that supports a battery 25.

A seat 23 on which the rider is seated is attached to the upper side of the rear inclined portion 8. More specifically, the seat 23 is supported on a pair of right and left rear inclined portions 8.

The rear inclined portion 8 includes a battery support portion 27. The battery support portion 27 is a portion that supports the battery 25 in the vehicle body frame 3 (a portion that receives a load of the battery 25). The battery 25 is able to store electricity. A battery support bracket 26 is placed in the battery support portion 27. The battery support portion 27 supports the battery 25 with the battery support bracket 26 interposed therebetween. The battery 25 is a battery that drives the rear wheels 35R and 35L.

The battery support bracket 26, which has a bottomed tubular shape, is positioned between the pair of right and left rear inclined portions 8. The battery 25 is placed on the battery support bracket 26 in a detachable manner. As a result, the battery 25 is arranged between the pair of right and left rear inclined portions 8. The battery 25 is positioned below the seat 23. Devices including a controller, a wire harness that extends out of the controller, a coupler, and the like, are located in the battery support bracket 26, though not shown. The controller is configured to electronically control the battery 25. The coupler connects the wire harness to a wire harness that extends out of each unit of the electric vehicle 1. These devices are, for example, located below the battery support bracket 26. When the battery 25 is placed on the battery support bracket 26, the battery 25 is electrically connected to the controller.

In a preferred embodiment of the present invention, the battery support bracket 26 is fixed only to the battery support portion 27 of the rear inclined portion 8. Placing the battery 25 on the battery support bracket 26 causes the load of the battery 25 to be applied to the battery support portion 27 of the rear inclined portion 8.

The rear inclined portion 8 includes no portion that supports the shock absorber 61. Any member that transmits an impact applied to the rear wheels 35R and 35L from each of rear arms 31L and 31R to the corresponding rear inclined portion 8 is not located between the rear inclined portion 8 and each of the rear arms 31L and 31R. That is, an end of the rear inclined portion 8 at the side close to the bottom portion 7 is a fixed end, and an end of the rear inclined portion 8 at the side close to the rear end (rearward, relative to the battery support portion 27) is a free end extending rearward.

In this condition, when a static load of the battery 25 is applied to the battery support portion 27, a relatively strong reaction force traveling upward occurs. This lessens a bending load tending to bend the bottom portion 7 into a downward convex shape.

As clearly shown in FIG. 1, the electric vehicle 1 is preferably a scooter-type vehicle in which a space S is provided above the bottom portion cover 22 and between the handlebar 13 and the seat 23. The space S enables the rider to ride on and get off the electric vehicle 1 without striding over the vehicle body. The rider may be seated on the seat 23 with his/her legs kept close together within the space S, or the rider may run the vehicle with his/her legs put in the space S.

In the description herein, an assembly including the vehicle body frame 3, the front cover 19 fixed integrally with the vehicle body frame 3, and the like, may be referred to as a "vehicle body" as appropriate.

Referring to FIGS. 1 and 2, the vehicle body frame 3 supports the right rear arm 31R, the left rear arm 31L, a lever 41, the bracket 51, and the shock absorber 61. The right/left rear arms 31R/31L, the lever 41, and the bracket 51 are arranged in this order from the rear toward the front. The lever 41 rotatably holds a rocker member 43. Rotation of the rocker member 43 causes the right/left rear arms 31R/31L to swing in opposite directions. When the right/left rear arms 31R/31L receive an impact, the rocker member 43, the lever 41, and the bracket 51 cooperate with one another to extend and retract the shock absorber 61.

In the following, these elements (31R, 31L, 41, 43, 51, 61) will be described in detail. Hereinafter, they will be referred to simply as "rear arm 31" when no distinction is required between the right rear arm 31R and the left rear arm 31L.

Referring to FIGS. 1 and 2, each of the right rear arm 31R and the left rear arm 31L is supported on the vehicle body frame 3 such that it is swingable on a swing shaft A1. The swing shaft A1 is parallel or substantially parallel to the vehicle width direction y. The swing shaft A1 is positioned rearward, relative to the bent portion 9 that is provided between the bottom portion 7 and the rear inclined portion 8. The swing shaft A1 is arranged below the bottom portion 7. The swing shaft A1 is arranged at a position rearward of the bracket support shaft A3 (front support portion) and below the battery support portion 27. More specifically, as shown in FIG. 2, a support member 32 attached to the rear end of the bottom portion 7 supports the right rear arm 31R and the left rear arm 31L. The support member 32 is an element of the vehicle body frame 3, and the swing shaft A1 is provided in the vehicle body frame 3. The support member 32 constitutes the bottom portion 7, and the swing shaft A1 is provided in the bottom portion 7. Each of the right rear arm 31R and the left rear arm 31L is arranged so as to extend rearward from the swing shaft A1.

As shown in FIGS. 2 and 3, an electric motor 33R is provided in a rear end portion of the right rear arm 31R. The electric motor 33R is electrically connected to the battery 25, and receives a power supply from the battery 25. The electric motor 33R is coupled to the right rear wheel 35R, and configured to rotationally drive the right rear wheel 35R. Likewise, an electric motor 33L is provided in a rear end portion of the left rear arm 31L. The electric motor 33L is coupled to the left rear wheel 35L, and configured to rotationally drive the left rear wheel 35L.

In a preferred embodiment of the present invention, the electric motors 33R and 33L are preferably in-wheel motors of the direct drive type. A direct drive indicates a mechanism in which a wheel (hub) rotates together with a rotor of an electric motor. No speed reducer (or no speed increaser) is interposed between the wheel and the rotor of the electric motor. The in-wheel motor is configured such that a rotor and a stator are located inside a hub with respect to the radial direction of a wheel.

A right stay 37R and a left stay 37L, which protrude downward, are connected to lower surfaces of the right rear arm 31R and the left rear arm 31L, respectively.

When the right rear arm 31R swings on the swing shaft A1, the right rear wheel 35R moves in the vertical direction z relative to the vehicle body. That is, the right rear arm 31R supports the right rear wheel 35R such that the right rear wheel 35R is vertically movable. Likewise, the left rear arm 31L supports the left rear wheel 35L such that the left rear wheel 35L is vertically movable.

As the electric motors 33R/33L rotationally drive the right rear wheel 35R and the left rear wheel 35L, respectively, the electric vehicle 1 advances.

As shown in FIGS. 1 and 2, the lever 41 is supported on the vehicle body frame 3 such that the lever 41 is swingable on a lever support shaft A2. The lever support shaft A2 is parallel or substantially parallel to the vehicle width direction y, and arranged frontward relative to the swing shaft A1. The lever support shaft A2 is arranged at a position rearward of the bent portion 9 and below the bottom portion 7. The lever support shaft A2 is provided in the vehicle body frame 3. The lever support shaft A2 is provided in the bottom portion 7.

The lever 41, which preferably is C-shaped or substantially C-shaped in a side view, is arranged such that the lever 41 is suspended on the lever support shaft A2. More specifically, as shown in FIG. 2, the lever 41 is supported on a support member 42 that is attached to the rear end of the bottom portion 7.

The lever 41 supports the rocker member 43 such that the rocker member 43 is rotatable on a rotation axis B. The rotation axis B passes through the center of the rocker member 43, and extends in a direction crossing the vehicle width direction y (for example, in a direction perpendicular or substantially perpendicular to the vehicle width direction y).

Figure 4A:
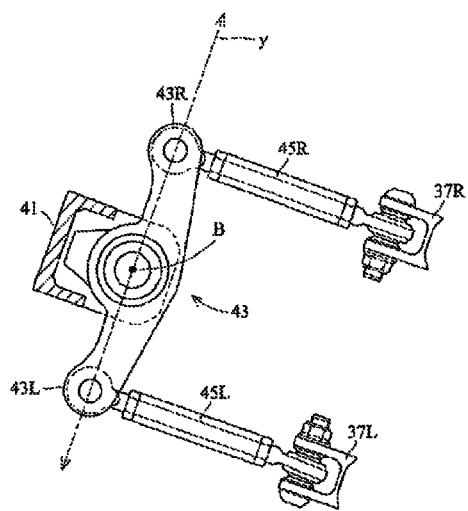
Figure 4B:
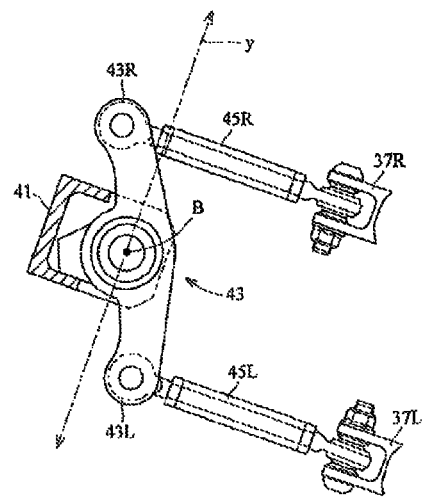

In FIGS. 4A and 4B which show cross-sectional views as taken along the line a-a of FIG. 2, FIG. 4A illustrates a state where the rocker member 43 is in a neutral position, and FIG. 4B illustrates a state where the rocker member 43 is not in the neutral position. The cross-sections shown in FIGS. 4A and 4B are on a plane perpendicular or substantially perpendicular to the rotation axis B.

As shown in FIGS. 4A and 4B, the rocker member 43 has a shape extending from the rotation axis B to the opposite sides with respect to the vehicle width direction y. A front end portion of a right rod 45R is coupled to a right end portion 43R of the rocker member 43. This allows the rocker member 43 and the right rod 45R to cooperate. A front end portion of a left rod 45L is coupled to a left end portion 43L of the rocker member 43. This allows the rocker member 43 and the left rod 45L to cooperate.

A rear end portion of the right rod 45R is coupled to a lower end portion of the right stay 37R. This allows the right rod 45R and the right stay 37R to cooperate. A rear end portion of the left rod 45L is coupled to a lower end portion of the left stay 37L. This allows the left rod 45L and the left stay 37L to cooperate (see also FIG. 2). Thus, the right end portion 43R and the left end portion 43L of the rocker member 43 are cooperatively coupled to the right rear arm 31R and the left rear arm 31L, respectively, by the two rods 45R and 45L that extend in the front-back direction x.

As shown in FIG. 2, each of the right rod 45R and the left rod 45L is inclined so that its front end portion is above its rear end portion. Accordingly, the rotation axis B is inclined obliquely upward and rearward. It is preferable that the rotation axis B is perpendicular or substantially perpendicular to the right/left rods 45R/45L in a side view.

As shown in FIG. 4A, when the rocker member 43 is in the neutral position, the right end portion 43R and the left end portion 43L are aligned side-by-side in the vehicle width direction y. In a side view, the right rod 45R and the left rod 45L are located at the same position. In this situation, the right rear arm 31R and the left rear arm 31L swing on the swing shaft A1 by the same amount, and the heights of the right rear wheel 35R and the left rear wheel 35L are at the same level relative to the vehicle body. The vehicle body stands upright.

As the rocker member 43 rotates about the B axis in one direction as shown in FIG. 4B, the right rod 45R moves substantially frontward while the left rod 45L moves rearward. In this situation, the lower end portion of the right stay 37R moves substantially frontward, so that the right rear arm 31R swings downward, thus causing the right rear wheel 35R to move substantially downward. On the other hand, the lower end portion of the left stay 37L moves substantially rearward, so that the left rear arm 31L swings upward, thus causing the left rear wheel 35L to move substantially upward.

The rocker member 43 is allowed to move substantially in the front-back direction x along with swinging of the lever 41 on the lever support shaft A2. In the description herein, "movement of the rocker member 43" indicates movement of the rocker member 43 involving swinging of the lever 41, and "rotation of the rocker member 43" indicates rotation of the rocker member 43 about the rotation axis B.

A rear end portion of a rod 53 is also cooperatively coupled to the lever 41. The rod 53 includes a right rod 53R and a left rod 53L. As shown in FIG. 2, the left rod 53L is cooperatively coupled to the left of a lower end portion of the lever 41. The right rod 53R is cooperatively coupled to the right of the lower end portion of the lever 41, though not shown. The position at which the lever 41 supports the rod 53 is lower than the position at which the lever 41 supports the rocker member 43. As the lever 41 swings on the lever support shaft A2, the rod 53 moves substantially in the front-back direction x. The amount of movement of the rod 53 is larger than the amount of movement of the rocker member 43 under the condition that the amount of swinging of the lever 41 is the same.

The rod 53 corresponds to a first rod according to a preferred embodiment of the present invention. The right rod 45R and the left rod 45L correspond to a right second rod and a left second rod according to a preferred embodiment of the present invention, respectively.

As shown in FIGS. 1 and 2, the bracket 51 is supported on the vehicle body frame 3 such that the bracket 51 is swingable on the bracket support shaft A3. The bracket support shaft A3 is parallel or substantially parallel to the vehicle width direction y, and arranged frontward relative to the lever support shaft A2. The bracket support shaft A3 is positioned below the upper end of a front end portion of the bottom portion 7. The front end portion of the bottom portion 7 is inclined so that it extends upward from the bent portion 7a. Therefore, the height position of the bracket support shaft A3 is higher than the height positions of the swing shaft A1, the lever support shaft A2, and a shock absorber support shaft A4 which are mentioned above. The bracket support shaft A3 is also positioned below the upper end of the front end portion of the bottom portion 7.

The bracket 51, which preferably is L-shaped or substantially L-shaped in a side view, includes an upper portion 51A, a bent portion 51B, and a lower end portion 51C. The bracket 51 is arranged such that it is suspended on the bracket support shaft A3. More specifically, as shown in FIG. 2, the bracket 51 is supported on the support member 52 that is attached to the bottom portion 7.

The bracket 51 is supported in such a manner that the bent portion 51B extends obliquely downward and frontward from the bracket support shaft A3 while the lower end portion 51C extends obliquely downward and rearward from the bent portion 51B. As the bracket 51 swings on the bracket support shaft A3, the bent portion 51B and the lower end portion 51C move substantially in the front-back direction x.

The front end portion of the above-mentioned rod 53 is cooperatively coupled to the bent portion 51B of the bracket 51. Thus, the right rod 53R is supported on the right side of the bent portion 51B of the bracket 51, and the left rod 53L is supported on the left side of the bent portion 51B of the bracket 51. As the bracket 51 swings on the bracket support shaft A3, the rod 53 moves substantially in the front-back direction x.

As shown in FIG. 2, the rod 53 is inclined so that its front end portion is above its rear end portion. Here, the position at which the rod 53 is supported on the bracket 51 will be called "support point C1". The support point C1 is located below and frontward of the bracket support shaft A3. Accordingly, a tangent L2 at the support point C1 of an imaginary circle L1, which is a circle described by the support point C1 centered at the bracket support shaft A3, is inclined downward and rearward. That is, the direction in which the rod 53 is inclined and the direction in which the tangent L2 at the support point C1 extends are relatively close to each other. Therefore, movement of the rod 53 effectively causes the bracket 51 to swing.

The shock absorber 61 is arranged so as to extend substantially in the front-back direction x. The rear end portion 61b of the shock absorber 61 is, at the shock absorber support shaft A4, cooperatively coupled to the vehicle body frame 3. The shock absorber support shaft A4 is parallel or substantially parallel to the vehicle width direction y, and positioned frontward of the lever support shaft A2 and rearward of the bracket support shaft A3. The shock absorber support shaft A4 is arranged at a position below the bottom portion 7 and frontward of the bent portion 9 of the vehicle body frame 3. More specifically, as shown in FIG. 2, the shock absorber 61 is supported on the support member 62 that is attached to the bottom portion 7.

The front end portion 61a of the shock absorber 61 is supported on the lower end portion 51C of the bracket 51. As the bracket 51 swings on the bracket support shaft A3, the shock absorber 61 extends and retracts.

The shock absorber 61 is inclined so that its front end portion is below its rear end portion. The shock absorber 61 is arranged between the right rod 53R and the left rod 53L. Here, the position at which the shock absorber 61 is supported on the bracket 51 will be called "support point C2". The above-mentioned support point C1 is positioned between the support point C2 and the bracket support shaft A3 in a side view. In other words, in a side view, the bracket support shaft A3 is positioned above the support point C1 while the support point C2 is positioned below the support point C1. As a result, the shock absorber 61 and the rod 53 cross each other in a side view. The amount of stroke of the shock absorber 61 is larger than the amount of movement of the rod 53 under the condition that the amount of swinging of the bracket 51 is the same.

Preferably, the location of the support point C2 is selected based on the positional relationship with the direction in which the shock absorber 61 extends and retracts. To be specific, it is preferable that the support point C2 is located such that the direction of a tangent at the support point C2 of an imaginary circle that is described by the support point C2 centered at the bracket support shaft A3 is close to the direction in which the shock absorber 61 retracts. Alternatively, it is preferable that the support point C2 is located such that an imaginary line connecting the support point C1 to the support point C2 is perpendicular or substantially perpendicular to the direction in which the shock absorber 61 retracts. In these configurations, swinging of the bracket 51 effectively causes the shock absorber 61 to extend and retract.

The pedals 21 are arranged at the lateral sides, with respect to the vehicle width direction y, of the position at which the shock absorber 61 and the rod 53 cross each other. In other words, in a side view, the pedals 21 overlap the position at which the shock absorber 61 and the rod 53 cross each other.

Next, a brief description will be given to an exemplary operation in which the vehicle body of the electric vehicle 1 leans.

Figure 5:
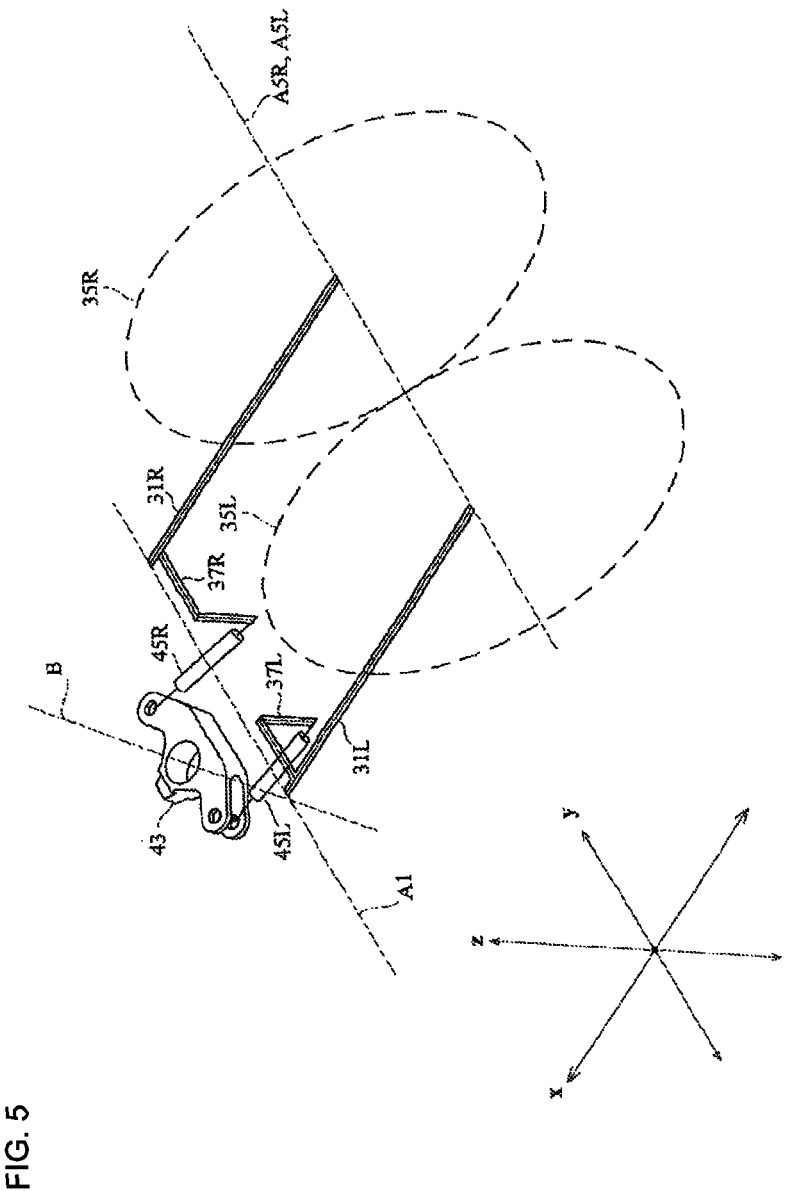
FIG. 5 is a perspective view of a portion of the electric vehicle, as seen from the rear left side.
Figure 6:
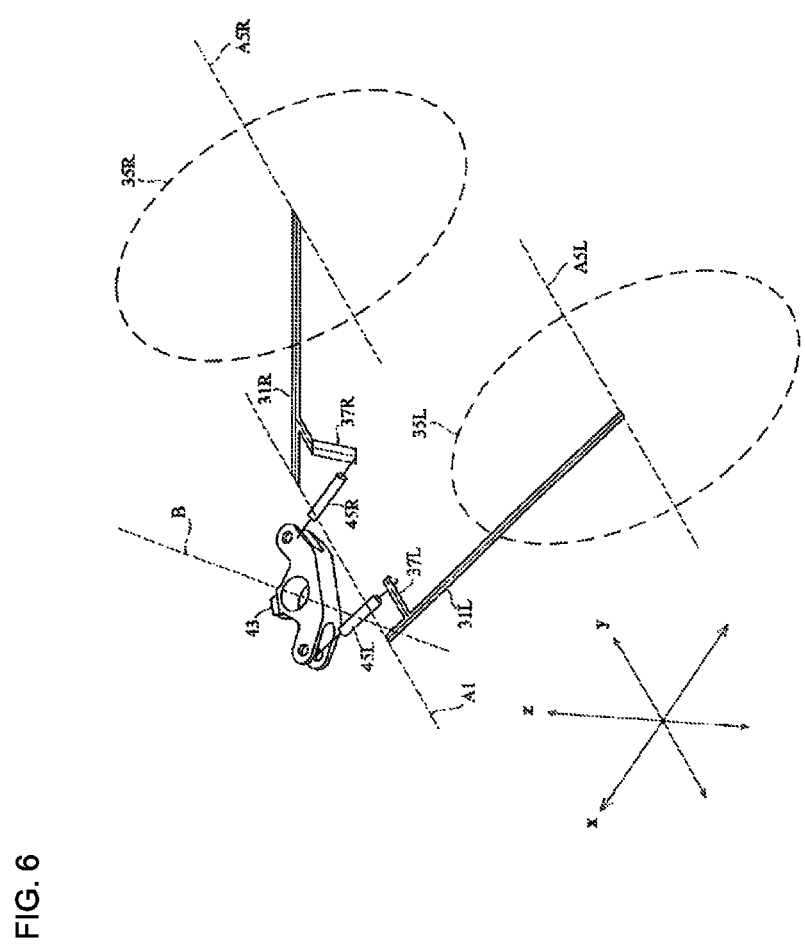
FIG. 6 is a perspective view of the portion of the electric vehicle as seen from the rear left side.
Figure 7:
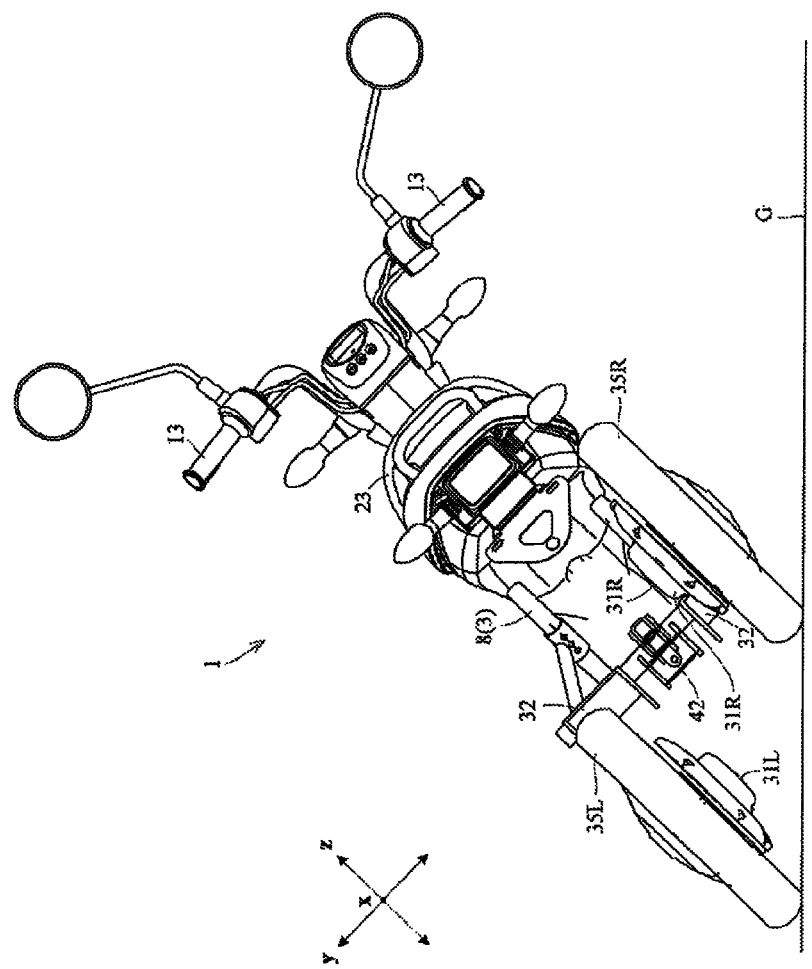
FIG. 7 is a rear view of the electric vehicle with its vehicle body leaning to the right.

Reference is made to FIGS. 5 to 7. FIGS. 5 and 6 show perspective views of a portion of the electric vehicle 1 as seen from the rear left side thereof. In a state shown in FIG. 5, the vehicle body is upright. In a state shown in FIG. 6, the vehicle body is leaning to the right. In FIGS. 5 and 6, the right/left rear arms 31R/31L and the right/left rods 45R/45L are illustrated schematically. FIG. 7 is a rear view of the electric vehicle 1, which corresponds to the state shown in FIG. 6. In a state shown in FIG. 7, the vehicle body is leaning to the right. FIG. 2 is a side view of the electric vehicle 1, which corresponds to the state shown in FIG. 5.

When the vehicle body is upright as shown in FIGS. 2 and 5, for example, the right rear wheel 35R and the left rear wheel 35L are at the same height position relative to the vehicle body. In this state, the rocker member 43 is in the neutral position. In FIGS. 5 and 6, an axle A5R of the right rear wheel 35R and an axle A5L of the left rear wheel 35L are shown.

As the vehicle body leans to the right, the right rear wheel 35R moves upward relative to the vehicle body, as shown in FIGS. 6 and 7. The right rear arm 31R swings upward on the swing shaft A1. The right rod 45R moves substantially rearward. The rocker member 43 rotates on the rotation axis B. The left rod 45L moves frontward. It is assumed that, at this time, the rocker member 43 does not move and the position of the rotation axis B is not changed. The left rear arm 31L swings downward on the swing shaft A1. The left rear wheel 35L moves downward relative to the vehicle body. The amount of downward movement of the left rear wheel 35L is equivalent or substantially equivalent to the amount of upward movement of the right rear wheel 35R. Therefore, both the right rear wheel 35R and the left rear wheel 35L are in contact with the road surface G.

When the vehicle body leans to the left, the members (31R, 31L, 35R, 35L, 43, 45R, 45L) move, swing, or rotate in the directions reverse to the above-mentioned directions.

Upon reception of an impact from the road surface G, the right rear wheel 35R and/or the left rear wheel 35L moves up and down quickly. Normally, an impact causing the right rear wheel 35R and/or the left rear wheel 35L to move substantially upward is greater than an impact causing them to move substantially downward.

The rocker member 43 can move not only when both the right rear wheel 35R and the left rear wheel 35L move up and down but also when only one of the right rear wheel 35R and the left rear wheel 35L moves up and down. For example, when only the right rear wheel 35R moves up and down quickly, the rotation of the left end portion 43L of the rocker member 43 cannot follow the rotation of the right end portion 43R of the rocker member 43, which creates a situation as if the rocker member 43 rotates on the left end portion 43L, resulting in displacement of the rocker member 43 itself. That is, the rocker member 43 moves, and the lever 41 swings accordingly.

Hereinafter, a situation where both the right rear wheel 35R and the left rear wheel 35L move upward upon reception of an impact from the road surface G will be described as an example. In the following, the rear wheels 35R and 35L operate in the same manner, and therefore they will be referred to simply as "rear wheel 35". For the same reason, the right rear arm 31R and the left rear arm 31L will be referred to simply as "rear arm 31", and the right rod 45R and the left rod 45L will be referred to simply as "rod 45".

FIGS. 8A and 8B show side views of a portion of the electric vehicle 1, in which FIG. 8A illustrates a state where the vehicle is stopped upright (that is, a state where no impact is received from the road surface G), and FIG. 8B illustrates a state where an impact is received from the road surface G. A normal running condition is similar to the state shown in FIG. 8A.

In the state shown in FIG. 8A, the angle α formed between the direction in which the shock absorber 61 extends and retracts and the direction in which the bottom portion 7 extends at the position of the shock absorber support shaft A4 is preferably about 45° or less, for example. In a case where the rear wheel 35 receives an upward impact when the vehicle is running with the vehicle body upright as shown in FIG. 8A, the rear arm 31 swings upward as shown in FIG. 8B. Along with this, the rod 45 moves substantially rearward, and the rocker member 43 moves substantially rearward. The movement of the rocker member 43 involves swinging of the lever 41, so that the rod 53 moves substantially rearward. At this time, the amount of movement of the rod 53 is larger than the amount of movement of the rocker member 43. Along with the movement of the rod 53, the bracket 51 swings. To be more specific, the rod 53 moves rearward and downward of the vehicle, and along with this movement, the bracket 51 rotates on the bracket support shaft A3 rearward and downward of the vehicle (see FIG. 8B). At this time, a load traveling downward of the vehicle is applied to the bracket support shaft A3 (front support portion) of the vehicle body frame 3. In this manner, the shock absorber 61 is located such that a load traveling downward of the vehicle is applied to the bracket support shaft A3 when the rear wheels 35 (35R and 35L) receive an impact from the road surface G.

The bracket 51 moving rearward and downward of the vehicle causes the shock absorber 61 to retract. At this time, the amount of retraction of the shock absorber 61 is larger than the amount of movement of the rod 53. The retraction of the shock absorber 61 absorbs an impact to significantly reduce or prevent transmission of the impact to the vehicle body. On the other hand, a load traveling upward of the vehicle is applied to the shock absorber support shaft A4 (rear support portion) of the vehicle body frame 3. In this manner, the shock absorber 61 is arranged such that a load traveling upward of the vehicle is applied to the shock absorber support shaft A4 when the rear wheels 35 (35R and 35L) receive an impact from the road surface G.

As thus far described, in the electric vehicle 1 according to a preferred embodiment of the present invention, the rear arms 31 (31R and 31L) are coupled to the shock absorber 61 via the members (41, 43, 45R, 45L, 51, 53) in such a manner that the rear arms 31 (31R and 31L) are cooperative with the shock absorber 61. This enables an impact received from the road surface G to be properly transmitted from the rear arms 31 (31R and 31L) to the shock absorber 61. As a result, the shock absorber 61 is able to absorb an impact, thus minimizing transmission of the impact to the vehicle body. This improves the comfort of riding the electric vehicle 1.

In particular, the lever 41, the rod 53, and the bracket 51 are provided between the rocker member 43 and the shock absorber 61. Therefore, the shock absorber 61 is properly extended and retracted in response to swinging of the rear arms 31 (31R and 31L).

The support point C1 is positioned between the bracket support shaft A3 and the support point C2, and this enables the amount of stroke of the shock absorber 61 to be larger than the amount of movement of the rod 53. Likewise, the lever 41 supports the rear end portion of the rod 53 at a position lower than the rocker member 43, and this enables the amount of movement of the rod 53 to be larger than the amount of movement of the rocker member 43. Accordingly, the amount of stroke of the shock absorber 61 corresponding to swinging of the rear arms 31 (31R and 31L) is ensured.

In a case where the rear wheels 35 (35R and 35L) move substantially upward relative to the vehicle body upon reception of an impact from the road surface G, the shock absorber 61 causes retraction instead of extension. That is, in the shock absorber 61, no cavitation occurs in its operating range where a spring in the rebound side, which comes after the absorption side in which an impact is absorbed, does not work. Therefore, a proper damping force is obtained. Additionally, the shock absorber 61 itself is downsized and simplified.

The bracket 51 supports the rod 53 at the support point C1 that is positioned frontward and obliquely downward of the bracket support shaft A3. The rod 53 is arranged inclined upward and frontward in a side view. This enables the bracket 51 to swing effectively in response to movement of the rod 53.

Moreover, the bracket 51 supports the shock absorber 61 at the support point C2 that is positioned rearward and obliquely downward of the support point C1. The shock absorber 61 is arranged inclined downward and frontward in a side view. This enables the shock absorber 61 to extend and retract effectively in response to swinging of the bracket 51.

The bracket 51 preferably is L-shaped or substantially L-shaped in a side view. Therefore, the above-described support points C1 and C2 are set on the bracket 51 with a compact configuration.

Based on the positional relationship among the shafts A1, A2, A3, and A4, the right/left rear arms 31R/31L, the lever 41, and the bracket 51 are arranged in this order from the rear toward the front, and the shock absorber 61 is positioned between the lever 41 and the bracket 51. The front end portion of the rod 53 is supported on the bracket 51 at the support point C1 that is positioned between the bracket support shaft A3 and the support point C2. Thus, the shock absorber 61 and the rod 53 cross each other in a side view. Such arrangement requires merely a compact space for installation of the members (41, 43, 51, 53, 61). Particularly, the height of the installation space significantly reduced or prevented.

Since the installation space is compact, the bottom portion cover 22 is located at a lower position. As a result, the space S between the handlebar 13 and the seat 23 is wide. More specifically, the space S contains an area whose height position from the road surface G is lower in a side view, as shown in FIG. 1. This allows the rider to easily ride on and get off the electric vehicle 1.

In a side view, the lever 41, the rocker member 43, the bracket 51, and the shock absorber 61, which are arranged horizontally or substantially horizontally, are positioned frontward, relative to the right/left rear arms 31R/31L. The right/left rear arms 31R/31L have only the right/left rods 45R/45L cooperatively coupled thereto with interposition of the right/left stays 37R/37L that protrude downward from the lower surfaces of the right/left rear arms 31R/31L, respectively. Thus, there are few members around the right/left rear arms 31R/31L and around the right/left rear wheels 35R and 35L. Therefore, a space is provided between the right rear arm 31R and the left rear arm 31L, and between the right rear wheel 35R and the left rear wheel 35L. This makes a rear portion of the electric vehicle 1 compact, or look compact. Additionally, effective use of a space existing in the rear portion of the electric vehicle 1 is provided.

The rod 53 is arranged inclined upward and frontward in a side view, while the shock absorber 61 is arranged inclined downward and frontward in a side view. As a result, the height of a space for installation of the rod 53 and the shock absorber 61 is significantly reduced or minimized.

The bracket support shaft A3 is arranged at a position higher than the shock absorber support shaft A4. Accordingly, increasing the size of the bracket 51 is easy. As a result, swinging of the bracket 51 effectively causes the shock absorber 61 to extend and retract.

The lever support shaft A2 and the shock absorber support shaft A4 are arranged adjacent to the bent portion 9 provided between the bottom portion 7 and the rear inclined portion 8. Thus, only a narrow region in the vehicle body frame 3 must have a high rigidity. Particularly, the lever support shaft A2 is arranged rearward relative to the bent portion 9, while the shock absorber support shaft A4 is arranged frontward relative to the bent portion 9. This properly avoids concentration of stress to one location.

The shafts A1, A2, A3, and A4 are arranged below the upper end of the bottom portion 7. This allows the members (45R, 45L, 43, 41, 51, 53, 61) to be properly arranged below the upper end of the bottom portion 7.

The pedals 21 are arranged at the lateral sides, with respect to the vehicle width direction y, of the position at which the shock absorber 61 and the rod 53 cross each other. This significantly reduces or prevents any increase in the height position of the pedals 21. As a result, a deterioration in the comfort of riding the electric vehicle 1 significantly reduced or prevented.

Normally, the bottom portion 7 of the vehicle body frame 3 receives a load of the vehicle body at a location between the front wheel 17 and the rear wheels 35R/35L. Therefore, a bending load tending to bend the bottom portion 7 into a downward convex shape occurs in the bottom portion 7. This bending load is enhanced when an impact from the road surface G is applied to the front wheel 17 and/or the rear wheels 35R/35L. In a preferred embodiment of the present invention, however, the bottom portion 7 of the vehicle body frame 3 includes the bracket support shaft A3 (front support portion) that indirectly supports the front end portion 61a of the shock absorber 61, and the swing shaft A1 is positioned rearward relative to the bracket support shaft A3. The bottom portion 7 extends rearward in the front-back direction from the rear end portion of the front inclined portion 6. This reduces the angle formed between the direction in which a force is inputted to the bracket support shaft A3 at a time of occurrence of an impact and the direction in which the bottom portion 7 extends in the front-back direction of the vehicle. As a result, the force inputted to the bracket support shaft A3 in the vehicle vertical direction at a time of occurrence of an impact is significantly reduced. This lessens a bending load caused in the bottom portion 7 at a time of occurrence of an impact.

The rear inclined portion 8 of the vehicle body frame 3 includes the battery support portion 27, and the swing shaft A1 is positioned below the battery support portion 27. This configuration makes it less likely that a bending load tending to bend the bottom portion 7 into a downward convex shape is applied to the bottom portion 7 due to the weight of the battery 25. Furthermore, due to the static weight of the battery 25, a reaction force traveling upward is applied to the bottom portion 7 of the vehicle body frame 3. This lessens a bending load caused in the bottom portion 7.

Lessening a load applied to the vehicle body frame 3 (particularly to the bottom portion 7) significantly reduces or prevents an increase in the weight of the vehicle body frame 3 which would be otherwise necessary to ensure a strength of the vehicle body frame 3. Moreover, the static weight of the battery 25, which is applied to the battery support portion 27, lessens a bending load tending to bend the bottom portion 7 into a downward convex shape. Therefore, an increase in the size of the battery, which provides an increase in the battery capacity, is easily obtained. As a result, a weight reduction of a vehicle body is achieved while ensuring a proper battery capacity.

In a preferred embodiment, the bottom portion 7 includes, at a position rearward of the bracket support shaft A3, the shock absorber support shaft A4 that supports the rear end portion 61b of the shock absorber 61.

Therefore, both the front end portion 61a and the rear end portion 61b of the shock absorber 61 are supported on the bottom portion 7. This further reduces the angle formed between the direction in which a load is applied to the bottom portion 7 at a time of extension and retraction of the shock absorber 61 and the direction in which the bottom portion 7 extends in the front-back direction of the vehicle. This makes it still less likely that a bending load tending to bend the bottom portion 7 into a downward convex shape is applied to the bottom portion 7.

In a preferred embodiment of the present invention, the shock absorber 61 is located such that a force tending to distance the bracket support shaft A3 and the shock absorber support shaft A4 from each other in the front-back direction of the vehicle is applied to the bracket support shaft A3 and the shock absorber support shaft A4 when the rear wheels 35R and 35L receive an upward impact from the road surface G.

The force tending to distance the bracket support shaft A3 and the shock absorber support shaft A4 from each other in the front-back direction of the vehicle can (at least partially) cancel the bending load tending to bend the bottom portion 7 into a downward convex shape. Therefore, the bending load tending to bend the bottom portion 7 into a downward convex shape is significantly reduced or minimized.

In a preferred embodiment, the angle formed between the direction in which the shock absorber 61 extends and retracts under the state where the vehicle is stopped upright and the direction in which the bottom portion 7 extends at the position of the shock absorber support shaft A4 is preferably about 45° or less, for example. This makes it still less likely that a bending load tending to bend the bottom portion 7 into a downward convex shape is applied to the bottom portion 7.

In a preferred embodiment, the bottom portion 7 includes, in addition to the bracket support shaft A3 and the shock absorber support shaft A4, a lever support shaft A2 (transmission member support portion) that supports the lever 41 that transmits an impact that the rear wheels 35R and 35L received from the road surface G to the shock absorber 61 through the rear arms 31R and 31L.

This disperses an impact to be applied to the bottom portion 7, thus significantly reducing or preventing an application of a high load locally to the bottom portion 7. Accordingly, an increase in the weight of the vehicle body frame 3 is significantly reduced or prevented, which would be otherwise necessary to ensure a strength of the vehicle body frame 3. The number of transmission member support portions may not always be one, and two or more transmission member support portions may be provided.

In a preferred embodiment, the rear inclined portion 8 does not include any portion that supports the shock absorber 61. The bottom portion 7 does not include any portion that supports the battery 25.

Since the rear inclined portion 8 does not include any portion that supports the shock absorber 61, the rear end of the rear inclined portion 8 is a free end. In this condition, the weight of the battery 25 is applied to the rear inclined portion 8 of the vehicle body frame 3. As a result, a relatively large reaction force traveling upward is caused in the bottom portion 7. This lessens the bending load tending to bend the bottom portion 7 of the vehicle body frame 3 into a downward convex shape.

The bottom portion 7, which extends in the front-back direction of the vehicle, is at a height position lower than the height position where the upper ends of the rear wheels 35R and 35L are located when the vehicle is stopped upright (see FIG. 8A).

Thus, the difference in the height between the bottom portion 7 and the rear arm 31 is small. This further reduces the angle formed between the direction in which a load is applied to the bottom portion 7 at a time of extension and retraction of the shock absorber 61 and the direction in which the bottom portion 7 extends in the front-back direction of the vehicle. This makes it still less likely that a bending load tending to bend the bottom portion 7 into a downward convex shape is applied to the bottom portion 7.

The bottom portion 7 includes a pair of right and left bottom portions 7. The shock absorber 61 is arranged between the pair of right and left bottom portions 7. Use of a space between the pair of right and left bottom portions 7 to locate the shock absorber 61 therein achieves downsizing of the vehicle.

The rear inclined portion 8 includes a pair of right and left rear inclined portions 8. The rear inclined portion 8 supports the seat 23. The battery 25 is arranged between the pair of right and left rear inclined portions 8. Use of a space between the pair of right and left rear inclined portions 8 to locate the battery 25 therein achieves downsizing of the vehicle.

The electric vehicle 1 includes the electric motors 33R and 33L that are supported on the pair of right and left rear arms 31R and 31L, respectively. The electric motors 33R and 33L drive the rear wheels 35R and 35L, respectively. Since the need to provide a power transmission mechanism between the vehicle body frame 3 and the rear arms 31R/31L is eliminated, a reduction in the weight of the vehicle body is achieved.

The rear inclined portion 8 supports the seat 23. The shock absorber 61 and the electric motors 33R/33L are arranged at the opposite sides of the swing shaft A1 with respect to the front-back direction of the vehicle. The height positions of the shock absorber 61 and the electric motors 33R/33L are lower than the height position where the upper ends of the rear wheels 35R and 35L are located when the vehicle is stopped upright. The battery 25 is located below the seat 23 and above the shock absorber 61 and the electric motors 33R/33L.

The battery 25 arranged at a higher position is less likely to receive an impact from the road surface G, and less likely to be kept immersed in water for a long time. Additionally, among the shock absorber 61, the electric motors 33R/33L, and the battery 25 which are heavy loads, the shock absorber 61 and the electric motors 33R/33L are arranged at a lower position. This lowers the center of gravity of the electric vehicle 1. Moreover, since the shock absorber 61 and the electric motors 33R/33L are arranged at a position lower than the upper ends of the rear wheels 35R and 35L, a wide space is ensured between the height position of the seat 23 and the height position of the shock absorber 61 and the electric motors 33R/33L. The battery 25 is placed in this space. This allows an increase in the battery capacity, and an improvement in the degree of freedom in the position where the battery 25 is located.

The electric motors 33L and 33R are preferably in-wheel motors of the direct drive type. Since the need to provide a power transmission mechanism is eliminated, a reduction in the weight of the vehicle body is achieved.

Providing the lever 41, the bracket 51, and the rod 53 enables simultaneous achievement of both ensuring an appropriate amount of stroke of the shock absorber 61 and requiring only a compact space for installation of the lever 41, the bracket 51, the rod 53, and the shock absorber 61. This more effectively prevents an impact received from the road surface G to be transmitted to the vehicle body, without a need to raise the height positions of the bottom portion cover 22 and the pedals 21 (in other words, without a need to raise the position of the space S arranged between the handlebar 13 and the seat 23). Accordingly, the comfort of riding the electric vehicle 1 during running is improved while comfort properties including easiness of riding on and getting off, an appropriate riding posture, and the like, are retained.

In a preferred embodiment, it is preferable that the right second rod and the left second rod are provided, the right second rod has its front end portion supported on the rocker member and its rear end portion supported on the right rear arm, the left second rod has its front end portion supported on the rocker member and its rear end portion supported on the left rear arm; and when the right rear wheel moves upward, the right second rod moves substantially rearward, and when the left rear wheel moves upward, the left second rod moves substantially rearward.

In this configuration, for example, as both the right rear wheel and the left rear wheel move upward, the rocker member moves rearward. Rearward movement of the rocker member causes the first rod to move rearward, so that the shock absorber retracts. As both the right rear wheel and the left rear wheel move downward, the first rod moves frontward, so that the shock absorber extends. As for an impact received from a road surface, an impact causing the right rear wheel and/or the left rear wheel to move upward is larger than an impact causing them to move downward. That is, the above-mentioned configuration enables a relatively large impact to be absorbed by retraction of the shock absorber. Thus, in the shock absorber, no cavitation occurs in its operating range where a spring in the rebound side, which comes after the absorption side in which an impact is absorbed, does not work. Therefore, a proper damping force is obtained. Additionally, an increase in size and complication of the shock absorber is prevented.

In a preferred embodiment, it is preferable that in a case where an impact that at least one of the right rear wheel and the left rear wheel receives from the road surface is substantially upward, the rocker member, the lever, the first rod, and the bracket cooperate with one another to cause the shock absorber to retract. This enables a relatively large impact to be absorbed by retraction of the shock absorber. Thus, in the shock absorber, no cavitation occurs in its operating range where a spring in the rebound side, which comes after the absorption side in which an impact is absorbed, does not work. Therefore, a proper damping force is obtained. Additionally, an increase in size and complication of the shock absorber is prevented.

In a preferred embodiment, it is preferable that the shock absorber is inclined such that its front end portion is below its rear end portion, and the first rod is inclined such that its front end portion is above its rear end portion. This configuration allows the shock absorber and the first rod to cross each other properly. Additionally, an increase in the height of a space for installation of the shock absorber and the first rod is effectively reduced or prevented.

In a preferred embodiment, it is preferable that the position at which the front end portion of the first rod is supported on the bracket is located below and frontward of the bracket support shaft, and the position at which the front end portion of the shock absorber is supported on the bracket is located rearward and obliquely downward of the position at which the front end portion of the first rod is supported on the bracket. In this configuration, movement of the first rod effectively causes the bracket to swing. Additionally, swinging of the bracket effectively causes the shock absorber to extend and retract.

In a preferred embodiment of the present invention, it is preferable that the bracket includes a bent portion and a lower end portion and preferably is L-shaped or substantially L-shaped in a side view, the bracket is supported on the vehicle body frame such that the bent portion extends obliquely downward and frontward from the bracket support shaft while the lower end portion extends obliquely downward and rearward from the bent portion, the first rod is supported on the bent portion of the bracket, and the shock absorber is supported on the lower end portion of the bracket. In this configuration, movement of the first rod effectively causes the bracket to swing. Additionally, swinging of the bracket effectively causes the shock absorber to extend and retract. Furthermore, such a bracket is achieved with a compact configuration. Thus, a weight reduction is achieved.

In a preferred embodiment of the present invention, it is preferable that the bracket support shaft is arranged above the shock absorber support shaft. In this configuration, increasing the size of the bracket is easy. Accordingly, swinging of the bracket effectively causes the shock absorber to extend and retract.

In a preferred embodiment of the present invention, it is preferable that the shock absorber support shaft and the lever support shaft are arranged adjacent to the bent portion that is provided between the bottom portion and the rear inclined portion. The bent portion, in which the shape of the vehicle body frame changes, inherently has a relatively high rigidity. In the above-mentioned configuration, the shock absorber support shaft and the lever support shaft are arranged near the bent portion inherently having a relatively high rigidity. This narrows a region in the vehicle body frame that must have a high rigidity.

In a preferred embodiment of the present invention, it is preferable that the shock absorber support shaft is arranged frontward relative to the bent portion that is provided between the bottom portion and the rear inclined portion, and the lever support shaft is arranged rearward relative to the bent portion that is provided between the bottom portion and the rear inclined portion. In this configuration, the shock absorber support shaft and the lever support shaft are arranged separately at the front side and at the rear side of the bent portion, thus preventing a stress from concentrating at one location in the vehicle body frame. This narrows a region in the vehicle body frame that must have a high rigidity.

In a preferred embodiment of the present invention, it is preferable that the lever support shaft, the shock absorber support shaft, and the bracket support shaft are arranged below the vehicle body frame. Alternatively, in a preferred embodiment of the present invention, it is preferable that the lever support shaft, the shock absorber support shaft, and the bracket support shaft are arranged below the upper end of the bottom portion of the vehicle body frame. These configurations enable effective use of a space existing below the vehicle body frame. A space required for installation of the lever, the rocker member, the shock absorber, the bracket, the first rod, and the like, is small. Therefore, even though they are arranged below the vehicle body frame, a deterioration in the comfort of riding felt by the rider is still avoidable.

In a preferred embodiment of the present invention, it is preferable that the lever supports the rear end portion of the first rod at a position lower than the rocker member. This configuration enables the amount of movement of the first rod to be effectively larger than the amount of movement of the rocker member.

In a preferred embodiment of the present invention, it is preferable that the rocker member is supported on the lever at a location between the lever support shaft and the position at which the first rod is supported on the lever. This configuration enables the amount of movement of the first rod to be effectively larger than the amount of movement of the rocker member.

In a preferred embodiment of the present invention, it is preferable that the foot board includes pedals that are arranged at the lateral sides of the position at which the shock absorber and the first rod cross each other. This configuration minimizes an increase in the height position of the pedals.

In a preferred embodiment of the present invention, it is preferable that the foot board includes the bottom portion cover that is arranged above the shock absorber. A space ensured between a handlebar and a seat, which is specific to the scooter type of vehicle, is provided above the bottom portion cover.

In a preferred embodiment, it is preferable that the electric motor and the battery are included, the electric motor being configured to generate motive power to drive the right rear wheel and the left rear wheel, the battery being configured to store electricity that is to be supplied to the electric motor. This configuration provides an electric vehicle.

Preferred embodiments of the present invention are not limited to the above-described preferred embodiments, and can be modified and embodied as follows.

Although the above-described preferred embodiments illustrate the case where the battery 25 is preferably arranged below the seat 23, this is not limiting.

Figure 9:
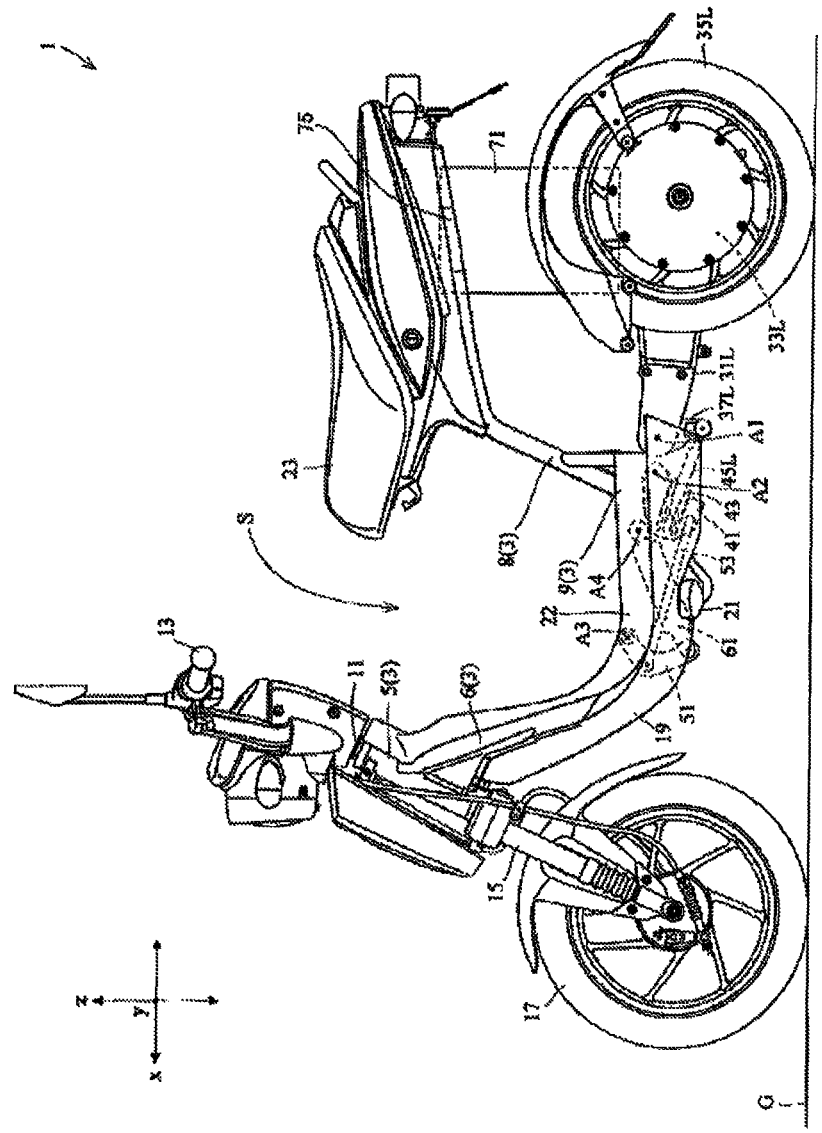
FIG. 9 is a side view showing an electric vehicle according to a first variation of the first preferred embodiment of the present invention.
Figure 10:
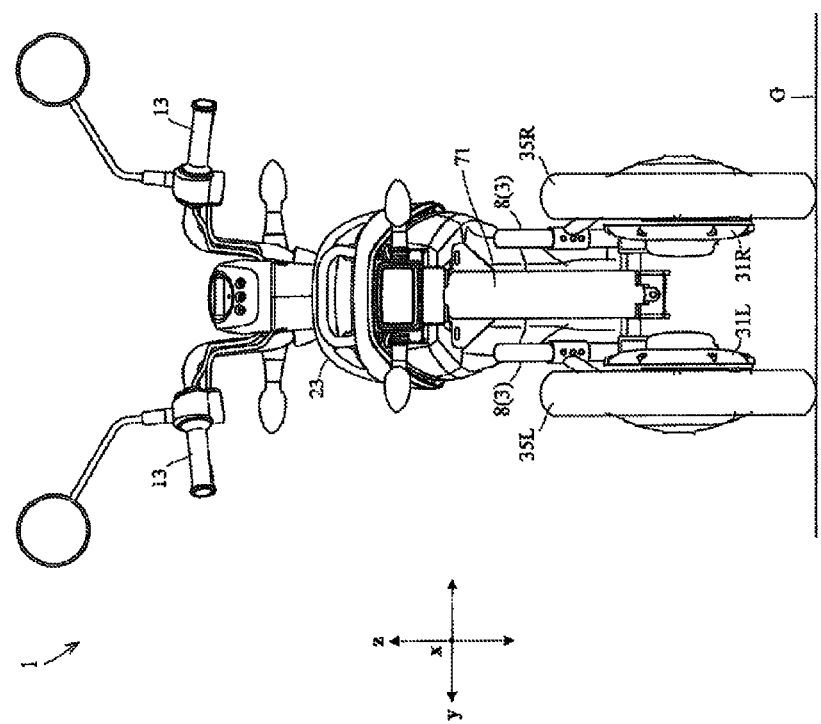
FIG. 10 is a rear view of the electric vehicle according to the first variation of the first preferred embodiment of the present invention.

Reference is made to FIGS. 9 and 10. FIG. 9 is a side view of an electric vehicle according to a first variation of the preferred embodiments described above. FIG. 10 is a rear view of the electric vehicle according to the first variation. Except for the position of the battery, the same configuration as that described above is used. Therefore, the same reference signs are given without a detailed description thereof. As shown in FIG. 9, a battery support portion 75 is located in the rear inclined portion 8 and at a position aligning with the rear wheels 35R and 35L with respect to the vehicle vertical direction. The battery support portion 75, which is located in the pair of right and left rear inclined portions 8, supports the battery 71 between the pair of right and left rear inclined portions 8. Therefore, the battery 71 is arranged between the right rear arm 31R and the left rear arm 31L with respect to the width direction of the vehicle. The battery 71 is arranged rearward relative to the swing shaft A1. The battery 71 is arranged so as to overlap the right rear wheel 35R and the left rear wheel 35L in a side view. In the first variation, a space existing between the right rear arm 31R and the left rear arm 31L and/or a space existing between the right rear wheel 35R and the left rear wheel 35L is effectively used as a space for installation of the battery 71.

In a preferred embodiment of the present invention, the number of battery support portions included in the rear inclined portion is not particularly limited. For example, in a case where an electric vehicle 1 is provided with a single rear inclined portion arranged at the center with respect to the vehicle width direction, the single rear inclined portion may include one battery support portion or may include two or more battery support portions. In a case where the electric vehicle 1 is provided with a plurality of rear inclined portions (for example, the pair of right and left rear inclined portions 8), each of the rear inclined portions may include one battery support portion (the battery support portion 75 shown in FIGS. 9 and 10) or may include two or more battery support portions.

In the case illustrated in FIGS. 9 and 10, the battery support portion 75 supports the battery 71 at an upper portion of the battery 71. In another preferred embodiment, however, it suffices that the battery support portion is provided in the rear inclined portion, and no particular limitation is put on the position of the battery support portion.

In a possible example, each of a pair of right and left rear inclined portions includes battery support portions each positioned in each of upper and front portions of the battery in a side view of the vehicle (for example, four battery support portions in total are provided), and the battery is supported on the plurality of battery support portions. More specifically, a first member extending downward of the vehicle is provided in the battery support portion positioned in the upper portion of the battery, and a second member extending rearward of the vehicle is provided in the battery support portion positioned in the front portion of the battery. A lower portion of the first member and a rear portion of the second member are coupled to each other, thus defining a battery support that supports the battery. Such a battery support has, for example, an L-shaped or substantially L-shaped configuration when seen from the right side of the vehicle. The battery support portion supports the battery via the battery support.

Reference is made to FIGS. 11A to 11C, in which FIG. 11A is a horizontal cross-sectional view of a portions of the electric vehicle according to the first variation; FIG. 11B is a vertical cross-sectional view of the portion of the electric vehicle according to the first variation; and FIG. 11C is a cross-sectional view as taken along the line b-b of FIG. 11B. In an example shown in FIGS. 11A to 11C, the battery 72 is not supported on the rear inclined portion 8, and the battery 72 is arranged at the lateral sides of the shock absorber 61 with respect to the vehicle width direction y. Alternatively, the battery 72 may be arranged below a foot board 73 in a case where the foot board 73 is provided above the bottom portion 7 of the vehicle body frame 3. Such variations may further include a casing 74 to receive the battery 72 so that the battery 72 is isolated from the shock absorber 61, the rod 53, and the like. It may be also acceptable that the foot board 73 serves as an upper surface of the casing 74. In these variations, a space existing at the lateral sides of the shock absorber 61 and the like is effectively used as a space for installation of the battery 72.

Although the above-described preferred embodiments illustrate the case where the pedals 21 and the bottom portion cover 22 preferably are provided as the foot board, this is not limiting. The shapes and positions of the pedals 21 and the bottom portion cover 22 can be changed appropriately. In a possible change, as shown in FIGS. 11A to 11C, the foot board 73, or the like, that covers the upper side of the pair of right and left bottom portions 7 may be provided instead of the pedals 21 and the bottom portion cover 22.

Although the above-described preferred embodiments illustrate the case where the electric motors 33R and 33L preferably are arranged in the rear end portions of the right rear arm 31R and the left rear arm 31L, respectively, this is not limiting. In a possible change, for example, the electric motor may be supported on the vehicle body frame 3. In this variation, it may be acceptable to provide a mechanism that transmits motive power appropriately generated by the electric motor to the right rear wheel 35R and the left rear wheel 35L.

Although the above-described preferred embodiments illustrate the case where the electric motor 33R configured to rotationally drive the right rear wheel 35R alone and the electric motor 33L configured to rotationally drive the left rear wheel 35L alone preferably are provided separately, this is not limiting. A common electric motor configured to rotationally drive the right rear wheel 35R and the left rear wheel 35L may be provided.

Although the above-described preferred embodiments illustrate the case where the bracket 51 preferably is L-shaped or substantially L-shaped in a side view, this is not limiting. In a possible change, for example, a bracket 81 may have a triangular or substantially triangular shape in a side view, as shown in FIG. 11B.

Although the above-described preferred embodiments illustrate a three-wheel vehicle preferably including the single front wheel 17 and the pair of rear wheels (35R, 35L), this is not limiting. A four-wheel vehicle (four-wheel vehicle configured to lean its vehicle body frame when turning) including a pair of front wheels and a pair of rear wheels may also be provided.

Although the above-described preferred embodiments illustrate the case where the electric vehicle 1 that preferably is a two-rear-wheel electric vehicle is of the scooter type, the preferred embodiments of the present invention are not limited to this example.

In a preferred embodiment, it may be acceptable that the vehicle body frame includes a frame member provided between the head pipe and the rear inclined portion. In such a case, the front end of the frame member is bonded to the head pipe, and the rear end of the frame member is bonded to the rear inclined portion.

It may be also acceptable that the vehicle body frame includes a frame member arranged between the front inclined portion and the rear inclined portion, the frame member being separate from the bottom portion and provided above the bottom portion. In such a case, the front end of the frame member is bonded to the front inclined portion at a position upward of the rear end portion of the front inclined portion, and the rear end of the frame member is bonded to the rear inclined portion at a position upward of the front end portion of the rear inclined portion.

In the case illustrated in the above-described preferred embodiments, the shafts A1, A2, A3, and A4 preferably are located in the vehicle body frame 3, the shaft A1 supports the rear arm 31 (31R, 31L), the shaft A2 supports the lever 41, the shaft A3 supports the bracket 51, the shaft A4 supports the rear end portion 61b of the shock absorber 61, the rod 45 (45R, 45L) and the rocker member 43 are located between the rear arm 31 and the lever 41, the rod 53 (53R, 53L) is located between the lever 41 and the bracket 51, and the bracket 51 supports the front end portion 61a of the shock absorber 61.

However, preferred embodiments of the present invention are not limited to these examples. For example, the following configurations are also possible.

In a possible configuration, the shafts A1, A2, and A3 are located in the vehicle body frame 3, the shaft A1 supports the rear arm 31 (31R, 31L), the shaft A2 supports the lever 41, the shaft A3 supports front end portions 61a of a pair of right and left shock absorbers 61, the rod 45 (45R, 45L) and the rocker member 43 are located between the rear arm 31 and the lever 41, and the lever 41 supports rear end portions 61b of the pair of right and left shock absorbers 61. In this configuration, the front end portions 61a of the shock absorbers 61 are supported directly on the bottom portion 7. The shaft A3 corresponds to the front support portion. The rear end portions 61b of the shock absorbers 61 are supported indirectly on the bottom portion 7 with interposition of the lever 41. The shaft A2 corresponds to the rear support portion.

In another possible configuration, the rocker member 43 is rotatably provided in the bottom portion 7, and the right end portion 43R of the rocker member 43 is connected to the right rear arm 31R by a shock absorber 61 while the left end portion 43L of the rocker member 43 is connected to the left rear arm 31L by another shock absorber 61. Rotation of the rocker member 43 causes the right/left rear arms 31R/31L to swing in opposite directions. In this configuration, the front end portions 61a of the shock absorbers 61 are supported indirectly on the bottom portion 7 with interposition of the rocker member 43. A portion at which the rocker member 43 is supported corresponds to the front support portion.

In a preferred embodiment of the present invention, members (such as the support members 52 and 62) directly fixed to the bottom portion 7 are members that define the bottom portion 7.

A situation where the end portion of the shock absorber is supported directly on the front support portion or the rear support portion includes instances where the end portion of the shock absorber is fixed to the front support portion or the rear support portion and instances where the end portion of the shock absorber is displaceably supported on the front support portion or the rear support portion. For example, the rear end portion 61b of the shock absorber 61 shown in FIG. 2 is displaceably supported on the shock absorber support portion A4. This corresponds to the situation where the end portion of the shock absorber is supported directly on the rear support portion.

A situation where the end portion of the shock absorber is supported indirectly on the front support portion or the rear support portion includes instances where the end portion of the shock absorber is supported on the front support portion or the rear support portion with interposition of a member having a predetermined shape, and a portion where the end portion of the shock absorber is coupled to the member having the predetermined shape is displaceable while a portion where the front support portion or the rear support portion is coupled to the member having the predetermined shape is displaceable. For example, the front end portion 61a of the shock absorber 61 shown in FIG. 2 is supported indirectly on the bracket support portion A3 with interposition of the bracket 51 (a single member having a predetermined shape).

The front support portion receives a load at a time of compression or extension/retraction of the shock absorber caused by an impact that the rear wheel has received from a road surface. The same applies to the rear support portion.

In the case illustrated in the above-described preferred embodiments, an impact that the rear wheel 35 has received from the road surface G is transmitted to the shock absorber 61 via the stay 37 that is positioned below the swing shaft A1. Accordingly, as shown in FIG. 8B, a force pulling the rod 45 (45R, 45L), the rocker member 43, the lever 41, the rod 53 (53R, 53L), the bracket 51, and the shock absorber 61 toward the rear side of the vehicle is applied to them at a time of occurrence of an impact. In another preferred embodiment, however, it may be acceptable that the stay 37 is positioned above the swing shaft A1. In such a case, a force pushing members toward the front side of the vehicle is applied to the members.

The present invention is not limited to the above-described configurations, preferred embodiments, modifications and examples thereof. In another preferred embodiment of the present invention, it suffices that the bottom portion includes the front support portion that directly or indirectly supports the front end portion of the shock absorber and the shock absorber is configured such that an impact that the rear wheel has received from a road surface is transmitted to the shock absorber via the rear arm. The rear end portion of the shock absorber may be supported directly or indirectly on the rear support portion of the bottom portion, or may be supported on the rear arm. At a time of occurrence of an impact, either of a force traveling frontward of the vehicle and a force traveling rearward of the vehicle may be applied to a member that couples the rear arm to the end portion of the shock absorber. The shock absorber may be arranged so as to compress at a time of occurrence of an impact, or may be arranged so as to extend at a time of occurrence of an impact.

The preferred embodiments described above and the variations, modifications and examples of the preferred embodiments may be further varied as appropriate by, for example, replacing or combining certain components with components of other variations of the preferred embodiments.

Other possible configurations include:

(A) An electric vehicle configured to lean a vehicle body frame thereof when turning, the electric vehicle including a vehicle body frame; a right rear arm supported on the vehicle body frame, the right rear arm being swingable on a swing shaft, the right rear arm supporting a right rear wheel such that the right rear wheel is vertically movable; a left rear arm supported on the vehicle body frame, the left rear arm being swingable on the swing shaft, the left rear arm supporting a left rear wheel such that the left rear wheel is vertically movable; a foot board arranged frontward relative to the swing shaft; a lever supported on the vehicle body frame, the lever being swingable on a lever support shaft that is positioned frontward relative to the swing shaft; a rocker member rotatably supported on the lever, the rocker member configured to cause the right rear wheel and the left rear wheel to move vertically in opposite directions in cooperation with swinging of the right rear arm and swinging of the left rear arm; a bracket supported on the vehicle body frame, the bracket being swingable on a bracket support shaft that is positioned frontward relative to the lever support shaft; a shock absorber including a front end portion and a rear end portion, the front end portion being supported on the bracket, the rear end portion being supported on the vehicle body frame by a shock absorber support shaft that is positioned frontward relative to the swing shaft and rearward relative to the bracket support shaft; and a first rod including a front end portion and a rear end portion, the front end portion being supported on the bracket at a location between the bracket support shaft and the position at which the shock absorber is supported on the bracket, the rear end portion being supported on the lever, the first rod being arranged so as to cross the shock absorber in a side view of the vehicle.

(B) The electric vehicle according to (A), including a right second rod including a front end portion and a rear end portion, the front end portion being supported on the rocker member, the rear end portion being supported on the right rear arm; and a left second rod including a front end portion and a rear end portion, the front end portion being supported on the rocker member, the rear end portion being supported on the left rear arm, the right second rod being configured to move substantially rearward when the right rear wheel moves upward, and the left second rod being configured to move substantially rearward when the left rear wheel moves upward.

(C) The electric vehicle according to (A) or (B), wherein the shock absorber is inclined such that a front end portion thereof is below a rear end portion thereof, the first rod is inclined such that a front end portion thereof is above a rear end portion thereof.

(D) The electric vehicle according to any one of (A) to (C), wherein a position at which the front end portion of the first rod is supported on the bracket is located below and frontward of the bracket support shaft, a position at which the front end portion of the shock absorber is supported on the bracket is located rearward and obliquely downward of the position at which the front end portion of the first rod is supported on the bracket.

(E) The electric vehicle according to any one of (A) to (D), wherein the bracket includes a bent portion and a lower end portion, and is L-shaped or substantially L-shaped in a side view, the bracket being supported on the vehicle body frame such that the bent portion extends obliquely downward and frontward from the bracket support shaft while the lower end portion extends obliquely downward and rearward from the bent portion, the first rod is supported on the bent portion of the bracket, and the shock absorber is supported on the lower end portion of the bracket.

(F) The electric vehicle according to any one of (A) to (E), wherein the bracket support shaft is arranged above the shock absorber support shaft.

(G) The electric vehicle according to any one of (A) to (F), wherein the vehicle body frame includes a head pipe provided in a front end portion of the vehicle body frame; a front inclined portion extending obliquely downward and rearward from the head pipe; a bottom portion extending substantially horizontally and rearward from a rear end portion of the front inclined portion; and a rear inclined portion extending obliquely upward and rearward from a rear end portion of the bottom portion, the shock absorber support shaft and the lever support shaft are arranged adjacent to a bent portion that is provided between the bottom portion and the rear inclined portion.

(H) The electric vehicle according to (G), wherein the shock absorber support shaft is arranged frontward relative to the bent portion that is provided between the bottom portion and the rear inclined portion, and the lever support shaft is arranged rearward relative to the bent portion that is provided between the bottom portion and the rear inclined portion.

(I) The electric vehicle according to any one of (A) to (G), wherein the lever support shaft, the shock absorber support shaft, and the bracket support shaft are arranged below the vehicle body frame.

(J) The electric vehicle according to any one of (A) to (I), wherein the lever supports the rear end portion of the first rod at a position lower than the rocker member.

(K) The electric vehicle according to any one of (A) to (J), wherein the rocker member is supported on the lever at a location between the lever support shaft and the position at which the first rod is supported on the lever.

(L) The electric vehicle according to any one of (A) to (K), wherein the foot board includes pedals that are arranged at the lateral sides of the position at which the shock absorber and the first rod cross each other.

(M) The electric vehicle according to any one of (A) to (L), wherein the foot board includes a bottom portion cover that is arranged above the shock absorber.

(N) The electric vehicle according to any one of (A) to (M), including an electric motor that generates motive power to drive the right rear wheel and the left rear wheel; and a battery configured to store electricity that is to be supplied to the electric motor.

(O) The electric vehicle according to (N), wherein the battery is arranged at the lateral side of the shock absorber.

(P) The electric vehicle according to (N), wherein the battery is arranged between the right rear arm and the left rear arm.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A two-rear-wheel electric vehicle configured to lean a vehicle body frame thereof when turning, the two-rear-wheel electric vehicle comprising:
a vehicle body frame;
a pair of right and left rear arms supported on the vehicle body frame, the pair of right and left rear arms being swingable about a swing shaft, the pair of right and left rear arms separately supporting a pair of right and left rear wheels, respectively;
a battery configured to drive the pair of right and left rear wheels; and
a shock absorber configured to lessen an impact that the pair of right and left rear wheels receive from a road surface, the shock absorber being configured such that the impact is transmitted thereto via the pair of right and left rear arms; wherein
the vehicle body frame includes:
a head pipe;
a front inclined portion extending obliquely downward and rearward from the head pipe;
a bottom portion extending rearward in a front-back direction of the vehicle from a rear end portion of the front inclined portion, the bottom portion including a front support portion that directly or indirectly supports a front end portion of the shock absorber; and
a rear inclined portion extending obliquely rearward and upward from a rear end portion of the bottom portion, the rear inclined portion including a battery support portion that supports the battery; and
the swing shaft is positioned rearward of the front support portion and below the battery support portion.

2. The two-rear-wheel electric vehicle according to claim 1, wherein the bottom portion includes a rear support portion that directly or indirectly supports a rear end portion of the shock absorber, the rear support portion being arranged rearward relative to the front support portion.

3. The two-rear-wheel electric vehicle according to claim 2, wherein the shock absorber is configured such that a force that distances the front support portion and the rear support portion from each other in the front-back direction of the vehicle is applied to the front support portion and the rear support portion when the pair of right and left rear wheels receive an upward impact from the road surface.

4. The two-rear-wheel electric vehicle according to claim 3, wherein an angle formed between a direction in which the shock absorber extends and retracts under a state where the vehicle is stopped upright and a direction in which the bottom portion extends at a position of the rear support portion is about 45° or less.

5. The two-rear-wheel electric vehicle according to claim 2, wherein the bottom portion further includes a transmission member support portion, and the transmission member support portion supports a member configured to transmit an impact that the pair of right and left rear wheels receive from the road surface to the shock absorber through the rear arm.

6. The two-rear-wheel electric vehicle according to claim 1, wherein the rear inclined portion does not include a portion that supports the shock absorber, and the bottom portion does not include a portion that supports the battery.

7. The two-rear-wheel electric vehicle according to claim 1, wherein the bottom portion extends in the front-back direction of the vehicle at a position lower than a position where upper ends of the pair of right and left rear wheels are located when the vehicle is stopped upright.

8. The two-rear-wheel electric vehicle according to claim 1, wherein the bottom portion includes a pair of right and left bottom portions, and the shock absorber is arranged between the pair of right and left bottom portions.

9. The two-rear-wheel electric vehicle according to claim 1, wherein the rear inclined portion includes a pair of right and left rear inclined portions, the rear inclined portion supports a seat, and the battery is arranged between the pair of right and left rear inclined portions.

10. The two-rear-wheel electric vehicle according to claim 1, further including electric motors to drive the pair of right and left rear wheels, respectively, the electric motors being supported on the pair of right and left rear arms, respectively.

11. The two-rear-wheel electric vehicle according to claim 10, wherein the rear inclined portion supports a seat, the shock absorber and the electric motors are arranged at opposite sides of the swing shaft with respect to the front-back direction of the vehicle, the shock absorber and the electric motors are arranged at a position lower than the position where the upper ends of the pair of right and left rear wheels are located when the vehicle is stopped upright, and the battery is located below the seat and above the shock absorber and the electric motors.

12. The two-rear-wheel electric vehicle according to claim 11, wherein the battery is located between the right rear arm and the left rear arm with respect to a width direction of the vehicle.

13. The two-rear-wheel electric vehicle according to claim 1, wherein the battery is located rearward relative to the swing shaft.

14. The two-rear-wheel electric vehicle according to claim 1, further comprising:
a foot board located frontward relative to the swing shaft;
a lever supported on the vehicle body frame, the lever being swingable on a lever support shaft that is positioned frontward relative to the swing shaft;
a rocker member rotatably supported on the lever, the rocker member causing the right rear wheel and the left rear wheel to move vertically in opposite directions in cooperation with swinging of the pair of right and left rear arms;
a bracket supported on the vehicle body frame, the bracket being swingable on a bracket support shaft that serves as the front support portion and that is positioned frontward relative to the lever support shaft; and
a first rod including a front end portion and a rear end portion, the front end portion being supported on the bracket at a location between the bracket support shaft and a position at which the shock absorber is supported on the bracket, the rear end portion being supported on the lever, the first rod being arranged so as to cross the shock absorber in a side view of the vehicle; wherein
the front end portion of the shock absorber is supported on the bracket; and
the rear end portion of the shock absorber is supported on the vehicle body frame by a shock absorber support shaft that is positioned frontward relative to the swing shaft and rearward relative to the bracket support shaft.

15. The two-rear-wheel electric vehicle according to claim 14, further comprising:
a right second rod including a front end portion and a rear end portion, the front end portion being supported on the rocker member, the rear end portion being supported on the right rear arm; and
a left second rod including a front end portion and a rear end portion, the front end portion being supported on the rocker member, the rear end portion being supported on the left rear arm; wherein
the right second rod is configured to move substantially rearward when the right rear wheel moves upward; and
the left second rod is configured to move substantially rearward when the left rear wheel moves upward.

16. The two-rear-wheel electric vehicle according to claim 14, wherein the shock absorber is inclined such that a front end portion thereof is below a rear end portion thereof; and the first rod is inclined such that a front end portion thereof is above a rear end portion thereof.

17. The two-rear-wheel electric vehicle according to claim 14, wherein a position at which the front end portion of the first rod is supported on the bracket is located below and frontward of the bracket support shaft; and
a position at which the front end portion of the shock absorber is supported on the bracket is located rearward and obliquely downward of the position at which the front end portion of the first rod is supported on the bracket.

18. The two-rear-wheel electric vehicle according to claim 14, wherein the shock absorber support shaft and the lever support shaft are arranged adjacent to a bent portion that is provided between the bottom portion and the rear inclined portion.

19. The two-rear-wheel electric vehicle according to claim 18, wherein the shock absorber support shaft is arranged frontward relative to the bent portion that is provided between the bottom portion and the rear inclined portion; and
the lever support shaft is arranged rearward relative to the bent portion that is provided between the bottom portion and the rear inclined portion.

20. The two-rear-wheel electric vehicle according to claim 14, wherein the lever support shaft, the shock absorber support shaft, and the bracket support shaft are arranged below the vehicle body frame.

* * * * *